United States Patent
Lee et al.

(10) Patent No.: US 9,834,651 B2
(45) Date of Patent: *Dec. 5, 2017

(54) NANOCELLULOSE SURFACE COATED SUPPORT MATERIAL

(71) Applicants: Koon-Yang Lee, London (GB); Puja Bharadia, London (GB); Alexander Bismarck, London (GB)

(72) Inventors: Koon-Yang Lee, London (GB); Puja Bharadia, London (GB); Alexander Bismarck, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/353,212

(22) Filed: Nov. 16, 2016

(65) Prior Publication Data
US 2017/0218145 A1 Aug. 3, 2017

Related U.S. Application Data

(63) Continuation of application No. 14/886,792, filed on Oct. 19, 2015, now Pat. No. 9,506,186, which is a continuation of application No. 13/878,986, filed as application No. PCT/EP2011/067777 on Oct. 12, 2011, now Pat. No. 9,193,130.

(30) Foreign Application Priority Data

Oct. 12, 2010 (GB) .................................. 1017220.3
Sep. 27, 2011 (GB) .................................. 1116630.3

(51) Int. Cl.
| | | |
|---|---|---|
| C08J 5/06 | (2006.01) | |
| D06M 15/05 | (2006.01) | |
| D06M 101/04 | (2006.01) | |

(52) U.S. Cl.
CPC .............. *C08J 5/06* (2013.01); *D06M 15/05* (2013.01); *C08J 2367/04* (2013.01); *C08J 2401/02* (2013.01); *D06M 2101/04* (2013.01)

(58) Field of Classification Search
CPC ...... C08J 5/06; C08J 2367/04; C08J 2401/02; D06M 15/05; D06M 2101/04
USPC ....................................................... 428/532
See application file for complete search history.

(56) References Cited

U.S. PATENT DOCUMENTS

| 4,378,431 A | 3/1983 | Brown, Jr. | |
| 9,193,130 B2 * | 11/2015 | Lee | D06M 15/05 |
| 9,506,186 B2 * | 11/2016 | Lee | D06M 15/05 |
| 2013/0273350 A1 | 10/2013 | Lee et al. | |

FOREIGN PATENT DOCUMENTS

| EP | 0396344 A2 | 11/1990 |
| WO | WO-8901074 A1 | 2/1989 |
| WO | WO-2008020187 A1 | 2/2008 |

OTHER PUBLICATIONS

Baltazar-Y-Jimenez, et al; Effect of Atmospheric Air Pressure Plasma Treatment on the Thermal Behaviour of Natural Fibres and Dynamical Mechanical Properties of Randomly-Oriented Short Fibre Composites; Biobased Mater Bioenergy., 2008; 2(3); 264-272.
Ganan, et al; Surface Modification of Sisal Fibers: Effects on the Mechanical and Thermal Properties of Their Epoxy Composites; Polym Compos.; 2005; 26(2); 121-127.
George, et al; Melt rheological behaviour of short pineapple fibre reinforced low density polyethylene composites; Polymer.; 1996; 38(24); 5421-5431.
International Preliminary Report on Patentability, PCT/EP2011/067777, dated Apr. 16, 2013, 8 pages.
International Search Report, PCT/EP2011/067777, dated Dec. 30, 2011, 3 pages.
Jeng, et al; Flexural failure mechanisms in injection-moulded carbon Fibre/PEEK composites; Comps Sci Technol., 2000; 60(9); 1863-1872.
Kaith, et al; Graft copolymerization of MMA onto flax under different reaction conditions: a comparative study; Express polym Lett., 2008; 2(2); p. 93, Abstract, 1 page.
Kalia, et al; Pretreatments of Natural Fibers and their Application as Reinforcing Material in Polymer Composites—A Review; Polym Eng Sci.; 2009:49(7); 1253-1272.
Mehta, et al; Effect of Fiber Surface Treatment on the Properties of Biocomposites from Nonwoven Industrial Hemp Fiber Mats and Unsaturated Polyester Resin; J. Appl Polym Sci.; 2006; 99(3); 1055-1068.
Mishra, et al; The compatibilising effect of maleic anhydride on swelling and mechanical properties of plant-fiber-reinforced novolac composites; Compos Sci Technol., 2000; 60(9); 1729-1735.
Mohanty, et al; ; Natural fibers, biopolymers and biocomposites; CRC Press, Boca Raton, Florida, 2005, p. 41 (3 pages).
Nair, et al; Thermal and dynamic mechanical analysis of polystyrene composites reinforced with short sisal fibres; Compos Sci Technol.; 2001; 61(16); 2519-2529.
Notice of allowance dated Jul. 20, 2015 for U.S. Appl. No. 13/878,986.
Office action dated Jan. 15, 2015 for U.S. Appl. No. 13/878,986.
Office action dated Feb. 3, 2016 for U.S. Appl. No. 14/886,792.
Office action dated May 22, 2014 for U.S. Appl. No. 13/878,986.
Pommet, et al.; Surface Modification of Natural Fibers Using Bacteria: Depositing Bacterial Cellulose onto Natural Fibers to Create Hierarchical Fiber Reinforced Nanocomposites; Biomacromolecules., 2008;9(6); 1643-1651.
Pothan, et al; The role of fibre/matrix interactions on the dynamic mechanical properties of chemically modified banana fibre/polyester composites; Compos Pt A-Appl Sci Manuf.; 2006; 37(9); 1260-1269.
Suryanegara, et al; The effect of crystallization of PLA on the thermal and mechanical properties of microfibrillated cellulose-reinforced PLA composites; Compos Sci Technol., 2009; 69(7-8); 1187-1192.

(Continued)

*Primary Examiner* — Leszek Kiliman
(74) *Attorney, Agent, or Firm* — Wilson Sonsini Goodrich & Rosati, P.C.

(57) ABSTRACT

The present invention relates to a process for the production of a surface coated support material wherein said process comprises contacting a support material with an aqueous dispersion of nanocellulose. The surface coated support material can be used in a composite material. The invention therefore further relates to the surface coated support material per se, a composite comprising the material, a process for the production of the composite material and an article produced from the composite material.

24 Claims, 12 Drawing Sheets

(56) References Cited

OTHER PUBLICATIONS

Tserki, et al; A study of the effect of acetylation and propionylation surface treatments on natural fibres; Compos PT A-Appl Sci Manuf.; 2005; 36(8); 1110-1118.

Valadez-Gonzalez, et al; Chemical modification of henequen fibers with an organosilane coupling agent; Compos Pt B-Eng.; 1999; 30(3); 321-331.

van den Oever, et al; Influence of the Physical Structure of Flax Fibres on the Mechanical Properties of Flax Fibre Reinforced Polypropylene Composites; Appl Compos Mater., 2000; 7(5-6); 387-402.

Notice of allowance dated Jul. 29, 2016 for U.S. Appl. No. 14/886,792.

\* cited by examiner

NANOCELLULOSE SURFACE COATED SUPPORT MATERIAL

CROSS REFERENCE

This application is a continuation application of U.S. application Ser. No. 14/886,792, filed Oct. 19, 2015, now U.S. Pat. No. 9,506,186, which is a continuation application of U.S. application Ser. No. 13/878,986, filed Jul. 1, 2013, now U.S. Pat. No. 9,193,130, which is a national stage application of PCT/EP2011/067777, filed Oct. 12, 2011 which claims priority of UK Application No. GB 1116630.3 filed Sep. 27, 2011 and UK Application No. GB 1017220.3, filed Oct. 12, 2010; and the aforementioned applications and the references cited therein are incorporated herein by reference in their entirety.

The present invention relates to a process for the production of a nanocellulose surface coated support material Research interest in utilising natural fibres, such as plant fibres as reinforcement for polymers is re-emerging in the field of engineering. Natural fibres have a number of advantages including their worldwide availability, high specific strength and modulus, low density, biodegradability and renewability. A particular application of such reinforced polymers is their use in composite materials.

A composite is a structural product made of two or more distinct components. While each of the components remains physically distinct, composite materials exhibit a synergistic combination of the properties of each component, resulting in a material with extremely favourable and useful characteristics. Composites are generally composed of a matrix component and a reinforcement component. The reinforcement provides the special mechanical and/or physical properties of the material and is provided as fibres or fragments of material. The matrix surrounds and binds the fibres or fragments together to provide a material which is durable, stable to heat, stable to corrosion, malleable, strong, stiff and light. Composites made with synthetic fillers such as glass or carbon fibres are extensively used for many applications, such as sport, automotive and aerospace. Their success is due to their specific properties, based on a strong interaction between the different components and a great stability.

The strength and stiffness of a composite material will depend on the strength and stiffness of the reinforcement component and its interaction with the matrix component. A weak mechanical interaction between the reinforcement component and the matrix component results in a composite material with limited practical applications. Improving the interaction of the reinforcement and the matrix components therefore provides composite materials which are stronger, more durable and less susceptible to stress and wear.

There are however a number of problems associated with the use of natural fibres to reinforce polymers, including the inherent variability in dimensions and mechanical properties of the fibres, even within the same cultivation. In addition, the use of natural fibres in composites has been limited by their low thermal stability, the resulting reduction in tensile properties after processing and their inherent hydrophilic nature. Attempts to render natural fibres more hydrophobic (thereby improving the compatibility between hydrophilic natural fibres and hydrophobic polymer matrices) have included silylation (Mehta G, Drzal L T, Mohanty A K, Misra M. J Appl Polym Sci. 2006; 99(3):1055-1068; Ganan P, Garbizu S, Llano-Ponte R, Mondragon T. Polym Compos. 2005; 26(2):121-127; Pothan L A, Thomas S, Groeninckx G. Compos Pt A-Appl Sci Manuf. 2006; 37(9):1260-1269; and Valadez-Gonzalez A, Cervantes-Uc J M, Olayo R, Herrera-Franco P J. Compos Pt B-Eng. 1999; 30(3):321-331), acetylation (Tserki V, Zafeiropoulos N E, Simon F, Panayiotou C. Compos Pt A-Appl Sci Manuf. 2005; 36(8):1110-1118), benzoylation (Nair K C M, Thomas S, Groeninckx G. Compos Sci Technol. 2001; 61(16):2519-2529), maleated coupling agents (Mishra S, Naik J B, Patil Y P. Compos Sci Technol. 2000; 60(9):1729-1735), isocyanate treatment (George J, Janardhan R, Anand J S, Bhagawan S S, Thomas S. Polymer. 1996; 37(24):5421-5431) and polymer grafting of natural fibres (Kaith B S, Kalia S. Express Polym Lett. 2008; 2(2):93-100). While these methods have improved the hydrophobicity of the natural fibres, these chemical treatments involve the use of large amounts of hazardous chemicals and the chemical waste must be handled and disposed of appropriately. This adds extra cost to the production of (modified) natural fibre reinforced composites.

Cellulose or plant fibres have been used in some applications in the art as reinforcement agents, such as the manufacture of paper. There are a number of sources of cellulose fibres. Cellulose microfibrils can be extracted from wood pulp or cotton. Cellulose whiskers called tunicin can also be extracted from tunicate, a sea animal. Finally, bacterial cellulose or nanocellulose can be produced by specific bacteria strains, the most efficient producer being *Acetobacter xylinum*.

The present invention provides a novel process for the production of a material reinforced with nanocellulose.

The first aspect of the invention therefore provides a process for the production of a surface coated support material; comprising
contacting a support material with an aqueous dispersion of nanocellulose.

It will be appreciated that the nanocellulose for the purposes of this invention is isolated nanocellulose (i.e. where the nanocellulose is bacterial cellulose, the support material is contacted with an aqueous dispersion of bacterial cellulose in the absence of a cellulose producing microorganism). The nanocellulose is therefore extracted, isolated and/or purified prior to the formation of the aqueous nanocellulose dispersion.

For the purposes of this invention, nanocellulose is crystalline cellulose with at least one dimension (i.e. height, length or depth) smaller than 100 nm. The source of the nanocellulose is not limited. The nanocellulose can therefore be extracted from a plant, such as wood pulp or cotton or can be extracted from an animal such as tunicate. Alternatively, cellulose can be produced by bacteria. The nanocellulose can be provided as nanofibrillated cellulose, cellulose nanowhiskers or bacterial cellulose.

The nanocellulose can be purified prior to its contact with the support material. Where the nanocellulose is bacterial cellulose, the bacteria cellulose can be purified by treatment with basic conditions to remove all microorganisms. Alternatively, the cellulose can be purified by centrifugation.

The nanocellulose can be extracted from a source thereof for example a food stuff such as Nata-de-coco or can be isolated from a bacterial culture of a cellulose producing microorganism. Examples of such a cellulose producing micro-organism include micro-organisms belonging to the genera, *Acetobacter, Rhizobium, Alcaligenes, Agrobacterium, Sarcina* and/or *Pseudomonas*. The micro-organism can be a strain adapted to culture in agitated conditions, such as *Acetobacter xylinum* BPR2001.

The shape and size of the cellulose will depend on the source of the cellulose. The cellulose is preferably provided as a nanofibre having a thickness of from 0.5 to 50 nm, preferably from 1 to 20 nm, more preferably from 2 to 10 nm, most preferably 1, 2, 3, 4, 5, 6, 7, 8, 9 or 10 nm. The cellulose fibre preferably has a width of from 0.5 to 100 nm, preferably 1 to 50 nm, more preferably 5 to 20 nm. The cellulose fibre preferably has a length of 0.5 micrometers to 1000 micrometers, preferably 1 micrometers to 500 micrometers, more preferably 5 to 300 micrometers, most preferably 10 to 150 micrometers. The cellulose is preferably produced as a nanofibre, such as a ribbon shaped nanofibril The nanocellulose is provided in the form of an aqueous dispersion, suspension or a slurry. Thus, the majority of the nanocellulose will not dissolve in the aqueous solution. The dispersion can be prepared by mixing the nanocellulose with an aqueous solution, for example water. The nanocellulose can be mixed with the water by agitation, for example by stirring, sonication, colloid milling, grinding or homogenisation.

The support is contacted with the aqueous dispersion of nanocellulose, preferably the support is immersed or dipped in the aqueous dispersion of nanocellulose (i.e. by slurry dipping). The support is preferably brought into contact with the aqueous dispersion of nanocellulose at room temperature for a period of from 1 to 2 hours, to 7 days, for example from 1 to 7 days, such as 2 to 5 days, preferably 3 days. It will be appreciated by a person skilled in the art that the time required to allow coating of the support will depend on the hydrophilicity and/or water uptake of the support. As a general guide, the minimum amount of time required will be the time required to obtain maximum moisture saturation of the support when immersed in water.

The support is provided as a polymer. In particular, the support can be provided as a pellet, a powder, loose fibres, a woven or non-woven fibre mat, a string or a tow. The polymer is preferably a reinforcement component or matrix component as used in the art for the manufacture of composite materials. For the purposes of this invention, the support is preferably a hydrophilic support.

The support is preferably provided in the form of a fibre, pellet or a powder, more preferably as a fibre. The polymer can be a synthetic polymer or a naturally derived or occurring polymer. In particular, the polymer may be a naturally occurring fibre or a synthetic polymer based fibre. For the purposes of this invention, the polymer is preferably a hydrophilic polymer (i.e. the polymer provides hydrogen-bonding sites).

The polymer can be a synthetic bioderived polymer such as poly(lactic acid) (PLA), polyhydroxyalkanoate (PHA), bacterial polyesters or synthetic, semi-synthetic or modified cellulose polymers such as cellulose acetate butyrate (CAB), cellulose butyrate, polypropylene (PP), polystyrene (PS), polymethylmetharylate (PMMA), Lyocell or rayon. The polymer can be a naturally occurring polymer such as wheat gluten, corn zein, wool, cellulose or starch. The fibre can be derived or obtained from a plant or animal. In particular, the fibre is preferably extracted from a plant, such as one or more of abaca, bamboo, banana, coir, coconut husk, cotton, flax, henequen, hemp, hop, jute, palm, ramie or sisal. Most preferably the fibre is a sisal fibre Where the support is obtained or derived from a natural source, the support can be biodegradable. It will be appreciated that the provision of a reinforced biodegradable material will provide benefits, particularly when used in composite materials.

After immersion of the support, it may be removed from the aqueous dispersion of bacterial cellulose and dried. In one embodiment, the process of the first aspect of further comprises the steps of removing the coated support material from the dispersion; and optionally drying the support material.

The step of removing the coated support material from the dispersion may be achieved by mechanical extraction of the support, for example, by using tweezers.

The support material can be dried according to any methods known in the art, for example, air drying, oven drying, freeze drying, drying in vacuo, infra-red irradiation etc. The method by which the support material is dried can impact on the orientation and arrangement of the bacterial cellulose coating on the support material, and can therefore be modified to manipulate the form of the material produced by the first aspect of the invention.

In a particular embodiment of the first aspect, the surface coated support material is dried with heating. Preferably, the support material is dried above room temperature, for example at a temperature of from 50° C. to 150° C., preferably 60° C., 70° C., 80° C., 90° C., 100° C., 110° C., 120° C., 130° C. or 140° C. The drying temperature can be provided as a range of temperatures selected from any of the discrete temperatures set out above, for example 70° C. to 90° C. The drying can be carried our in air or under a vacuum. The drying of the support material results in a dense nanocellulose layer on the surface of the material. The first aspect of the invention therefore provides a process for the production of a surface coated support material; comprising contacting a support material with an aqueous dispersion of nanocellulose;

removing the coated support material from the dispersion; and drying the support material at 70° C. to 90° C., preferably at 80° C.

wherein the nanocellulose is provided as a bacterial cellulose layer on the surface of the support material, preferably wherein the bacterial cellulose layer is a dense layer of bacterial cellulose. In a dense layer, the bacterial cellulose may form a layer which substantially covers the support material.

Alternatively, the surface coated support material is initially partially dried by layering the support material between two pieces of an absorbent material, such as filter paper. Pressure can be applied to the upper and/or lower piece of absorbent material, for example by the addition of a weight to increase the removal of liquid from the support material. The support material can then be further dried, at a temperature of 30 to 150° C., preferably 40° C., 50° C., 60° C., 70° C., 80° C., 90° C., 100° C., 110° C., 120° C., 130° C. or 140° C. The drying temperature can be provided as a range of temperatures selected from any of the discrete temperatures set out above, for example, 30° C. to 50° C. The drying is preferably carried out in an air oven. This two stage drying method results in the formation of hairy "fibres" or a hairy support, where the nanocellulose is orientated perpendicularly to the surface of the support material. The first aspect of the invention therefore further provides a process for the production of a surface coated support material; comprising contacting a support material with an aqueous dispersion of nanocellulose;

removing the coated support material from the dispersion; and drying the support material by layering the support material between two pieces of absorbent material followed by drying in an air oven at 30° C. to 50° C., preferably at 40° C.;

wherein the nanocellulose of the coating is orientated perpendicularly to the support surface.

In certain embodiments of a method comprising the steps of
removing the coated support material from the dispersion; and
optionally drying the support material,
the removing step is carried out by filtration of the dispersion, for example vacuum filtration, or by evaporation, for example under reduced pressure (i.e. under vacuum) and/or heating.

It will be appreciated by the skilled person that the steps of removing the coated support material from the dispersion and drying the coated support material may be carried out in a single step for example, by evaporation (e.g. by heating and/or under reduced pressure). For example, the dispersion comprising the coated support material may be heated to remove the coated support material from the dispersion by evaporation and to dry the support material.

When the coated support material is removed from the dispersion by filtration, for example, by vacuum filtration, the support material may be bound together by the nanocellulose (i.e. forming a body comprising coated support material bound by the nanocellulose). In embodiments where the coated support material is removed from the dispersion by filtration, the support material may be initially partially dried by layering the support material between two pieces of an absorbent material, such as filter paper. Pressure can be applied to the upper and/or lower piece of absorbent material, for example by the addition of a weight to increase the removal of liquid from the support material. The support material may be further dried, at a temperature of 30 to 150° C., preferably 40° C., 50° C., 60° C., 70° C., 80° C., 90° C., 100° C., 110° C. 120° C., 130° C. or 140° C. The drying temperature can be provided as a range of temperatures selected from any of the discrete temperatures set out above, for example, 50° C. to 70° C. The first aspect of the invention therefore further provides a process for the production of a surface coated support material; comprising
contacting a support material with an aqueous dispersion of nanocellulose;
removing the coated support material from the dispersion by filtration of the dispersion;
drying the support material by layering the support material between two pieces of absorbent material; and
optionally drying in an air oven at 50° C. to 70° C., preferably at 60° C.

The modified material can be stored at room temperature and pressure.

It has been found that the production of either a dense nanocellulose coating layer on the surface of the support material or nanocellulose coated hairy fibres, in which the nanocellulose is oriented perpendicularly to the surface of the support material results in an increase in surface area of the support material when compared with the unmodified support material.

In a preferred feature of the first aspect of the invention, the support can be modified by physical or chemical treatments prior to contact with the nanocellulose, such as atmospheric or low pressure plasma or corona treatments, solvent washing or extraction, bleaching, boiling or washing, for example in a basic solution, such as sodium hydroxide solution. In particular, the support can be washed with a solvent, such as an organic solvent (i.e. acetone, ethyl acetate etc. or an alcohol such as ethanol, methanol, propanol, butanol etc.) prior to exposing the support to an aqueous suspension or slurry of nanocellulose.

The second aspect of the invention relates to a surface coated support material obtainable by the process of the first aspect of the invention. Preferably the surface coated support material is obtained by the process of the first aspect of the invention.

In particular, the second aspect of the invention relates to a support material surface coated with nanocellulose, wherein the nanocellulose is provided as a dense nanocellulose coating.

Alternatively, the second aspect of the invention relates to a support material surface coated with nanocellulose, wherein the nanocellulose of the coating is orientated perpendicular to the support surface.

Alternatively, the second aspect of the invention relates to a support material surface coated with nanocellulose, wherein the support material is bound together by the nanocellulose.

The third aspect of the invention relates to a composite material comprising a reinforcement and a matrix wherein the reinforcement comprises a surface coated support material obtainable or obtained by the process of the first aspect of the invention. The composite material of the third aspect is a cellulose nanocomposite.

In a preferred embodiment of the third aspect of the invention, the matrix comprises cellulose. The cellulose is preferably dispersed through the matrix.

The material obtainable by the process of the first aspect can be used as a reinforcing agent for composite manufacturing. The material can therefore be combined with any conventional matrix known to a person skilled in the art. Where the material is biodegradable, in order to preserve the renewability and biodegradability of the material, bio-derived polymers such as poly(lactic acid) (PLA), polyhydroxyalkanoates (PHA, bacterial polyesters), polycarbonates, or modified cellulose polymers (cellulose acetate butyrate (CAB) or cellulose butyrate) or cellulose pulp, as well as epoxy resins such as plant based resins (for example acrylated epoxidised soybean oil (AESO) or epoxidised linseed oil) can be used as a matrix.

In a particularly preferred embodiment, the surface coated support material is used as a reinforcement for a polylactide, for example poly-L-lactide (PLLA) to create green hierarchical composites. The increased surface area of the surface coated support material increases the surface roughness of the surface coated support material and results in enhanced mechanical interlocking between the fibres and the matrix. The resulting composite exhibits improved mechanical properties, tensile properties, visco-elastic properties and flexural properties of the hierarchical composites compared with neat PLLA.

Alternatively, the third aspect of the invention relates to a composite material comprising a reinforcement and a matrix wherein the matrix comprises a surface coated support material obtainable or obtained by the process of the first aspect of the invention. The matrix comprising the material produced by the process of the first aspect of the invention can be combined with any conventional reinforcement known to a person skilled in the art. Where the matrix is biodegradable, the reinforcement is preferably also biodegradable.

The fourth aspect of the invention relates to a process for the production of a composite material according to the third aspect of the invention wherein a reinforcement comprising the surface coated support material obtainable by the first or of the second aspect is impregnated, mixed, or extruded with a matrix, such as a polymer or a resin. In certain embodiments, the surface coated support material is a surface coated support material wherein the support material is bound together by nanocellulose. The composite can be manufactured using any suitable process such as resin transfer moulding, sheet moulding, resin infusion moulding, or by powder impregnation, injection moulding and compression moulding. For example, the surface coated support material may be impregnated with a resin, such as acrylated epoxidised soybean oil (AESO) or epoxidised linseed oil and then cured, for example, by heating, optionally in the presence of an initiating species. In another example, the surface coated support material may be dispersed in a solution of a polymer, such as PLA, after which the solvent may be removed. Alternatively, the surface coated support material may be impregnated, mixed, or extruded with a polymer powder or a polymer fibre, preferably a thermoplastic polymer, allowing the composite material to be heat formed or consolidated into a desired shape.

The fourth aspect of the invention alternatively relates to a process for the production of a composite material according to the third aspect of the invention wherein a reinforcement is impregnated, mixed, or extruded with a matrix comprising the surface coated support material obtainable by the first or of the second aspect. The composite can be manufactured using any suitable process such as resin transfer moulding, sheet moulding, resin infusion moulding, or by powder impregnation, injection moulding and compression moulding.

The fifth aspect of the invention relates to a process for the production of a composite material comprising a reinforcement and a matrix wherein the reinforcement comprises a surface coated support material, wherein the composite material is produced by:
  contacting a support material with an aqueous dispersion of nanocellulose, wherein the aqueous dispersion of nanocellulose further comprises a matrix material;
  removing the composite material from the dispersion by filtration, preferably vacuum filtration; and
  optionally drying the composite material.

In certain embodiments, the matrix material is dispersed in the aqueous dispersion of nanocellulose. In other embodiments, the matrix material is a polymer, preferably a thermoplastic polymer. In another embodiment, the matrix material is a polymer powder or a polymer fibre. The matrix material may be a matrix as described in respect of the third aspect of the invention. The composite materials produced by this method may subsequently be moulded into a desired shape, for example by compression moulding or hot pressing. The support material and the drying step may be as described in respect of the first aspect.

The sixth aspect of the invention relates to an article produced from the composite material of the third aspect of the invention or a composite material produced by the process of the fourth aspect or the fifth aspect. The composite material is particularly provided for use in low-load applications, including but not limited to packaging, or use in the automotive, household, sport and/or construction industries. The article of the sixth aspect is preferably produced from a fully biodegradable composite material.

All preferred features of each of the aspects of the invention apply to all other aspects mutatis mutandis.

Definitions

A dense layer of nanocellulose is a support material coated with nanocellulose wherein the nanocellulose fibres are sufficiently orientated along the surface of the support material to form a substantially continuous layer. It will be appreciated that the dense layer can be composed of nanocellulose fibres stacked or layered on top of one another, where those fibres closest to the support will have at least a portion of the longitudinal axis of the fibre in contact with the support (i.e. they are support contacting fibres). Further nanocellulose fibres may be stacked or layered on the support contacting fibres to increase the thickness of the dense layer on the support. These further fibres may not be in contact with the support material.

The support material of the invention is therefore coated with nanocellulose, wherein a portion of the coating is in contact with the support surface and wherein the fibres of the portion of the coating in contact with the support surface have at least a part or portion of their longitudinal axis in contact with the support surface.

In the dense layer, the support contacting fibres are orientated so that at least a portion of the longitudinal axis of the fibres is in contact with the surface of the support. The fibres can lie entirely in alignment (and therefore in contact) with the surface. In this case, substantially all of the longitudinal axis of the fibres is in contact with the surface of the support. Alternatively, the fibres can be in contact with the support but not lie entirely in alignment. In this case, a portion of the longitudinal axis of the fibre is in contact with the surface. The fibres are in contact with the support and with each other such that a continuous layer is formed. A dense layer encompasses the provision of the fibres in an extended form and/or where the fibres are folded.

A hairy fibre or a hairy support is a support material coated with nanocellulose where at least a portion of the nanocellulose is orientated perpendicularly to the surface of the support material. Where nanocellulose of the coating is "orientated perpendicularly", in the context of this disclosure, it is meant that some, or in some embodiments substantially all, of the nanocellulose, rather than lying in alignment with the surface of the support material, extends at an angle therefrom (this encompasses not only nanocellulose extending at an angle of 90 degrees relative to the surface of the support material, but also encompasses nanocellulose which extends at any angle therefrom, rather than lying entirely in alignment with the surface).

The surface morphology of a support material (i.e. whether it is coated in hairy fibres or a dense layer) can be determined by visually inspecting the surface of the support material, for example by scanning electron microscopy (SEM). As set out in FIG. 1(d), the hairy fibres extend from the surface of the support material. Conversely, as set out in FIGS. 1(b) and (c), the fibres of the dense layer form a coating layer on the surface of the support material.

A surface coated support material is a support material, some or preferably substantially all of the surface of which is coated with nanocellulose. This is intended to encompass a support material coated with a dense and a hairy support as described above. This term is also intended to encompass a support material wherein nanocellulose coats the support material and also acts as a binder to bind support material together. Thus, a surface coated support material encompasses a body comprising support material bound together by nanocellulose.

The invention may be put into practice in various ways and a number of specific embodiments will be described by way of example to illustrate the invention with reference to the accompanying drawings, in which:

FIGS. 1a-1d illustrate scanning electron micrographs showing (1a) neat sisal fibres, (1b), densely bacterial cellulose (BC) coated sisal fibres at low magnification, (1c)

densely BC coated sisal fibres high magnification and (1d) "hairy" BC coated sisal fibres;

FIGS. 2a-2l illustrate fractured surface of fibre reinforced hierarchical composites at fibre-matrix interface and overall fractured surface, (2a) (2b) are PLLA-sisal, (2c) (2d) are PLLA-containing densely nanocellulose coated sisal fibres, (2e) (2f) are PLLA-containing hairy cellulose coated sisal fibres, (2g) (2h) are PLLA-sisal-BC, (2i) (2j) are BC-PLLA-containing densely nanocellulose coated sisal fibres and (2k) (2l) are BC-PLLA-containing hairy cellulose coated sisal fibres, respectively, (2a), (2c), (2e), (2g), (2i) and (2k) are at lower maginification. (2b), (2d), (2f), (2h), (2j) and (2l) are at higher magnification; and FIG. 3 illustrates graphs showing the temperature dependency of storage moduli and tan δ of neat PLLA and its hierarchical composites.

Figure 1A:
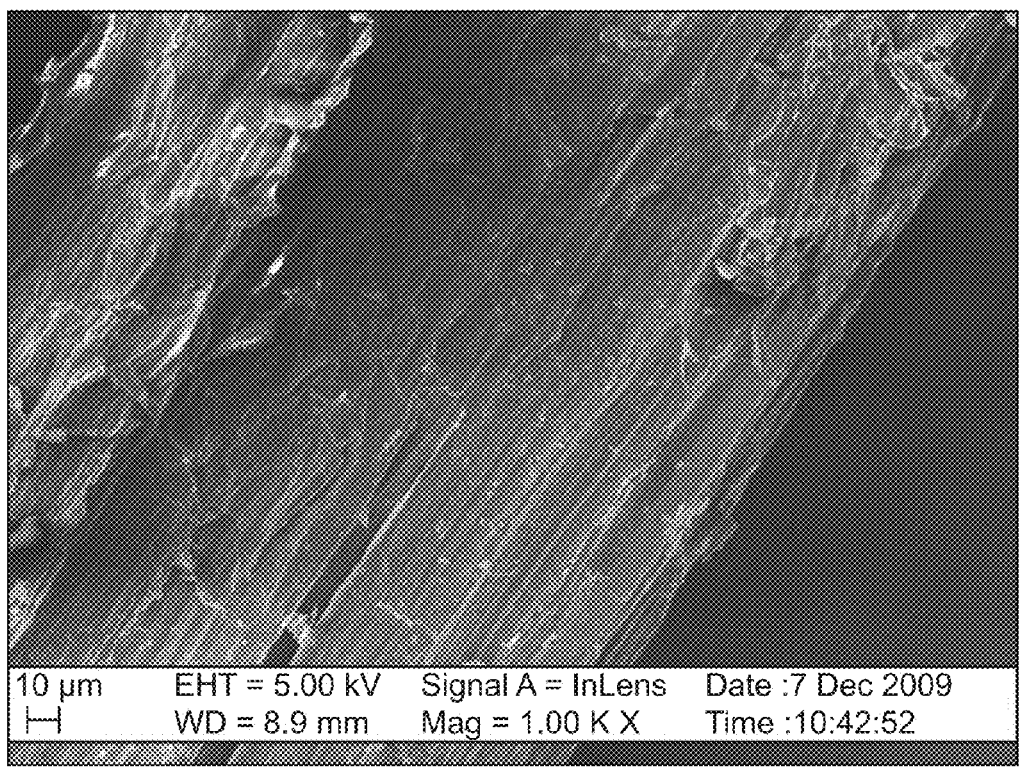
Figure 1B:
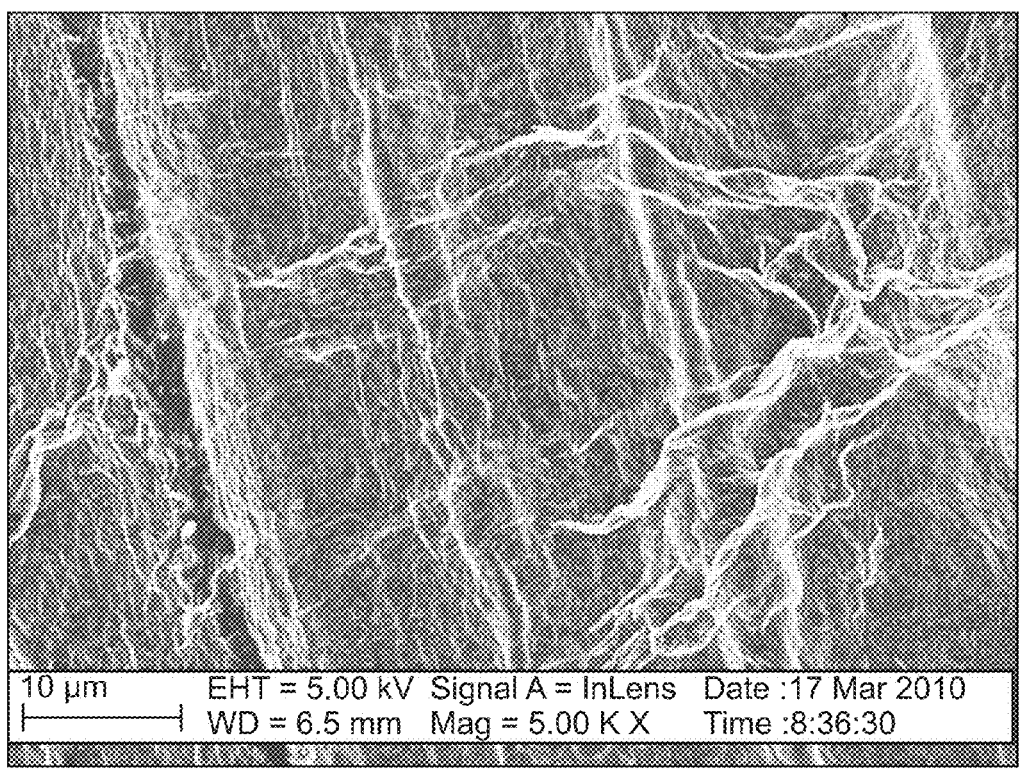
Figure 1C:
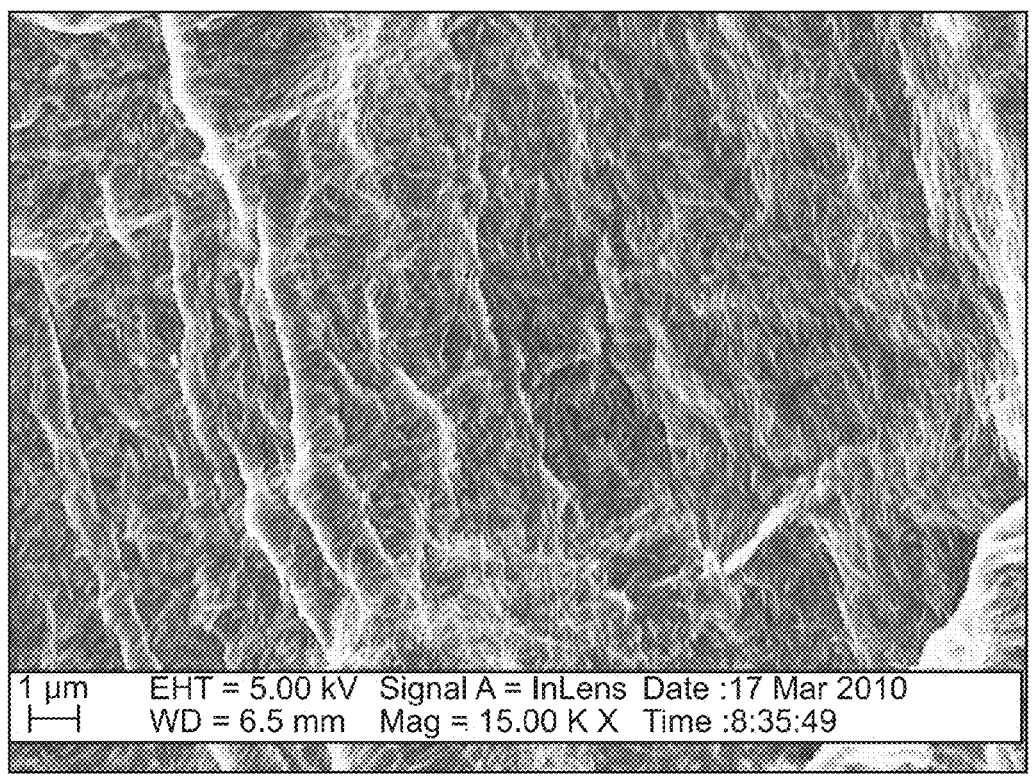
Figure 1D:
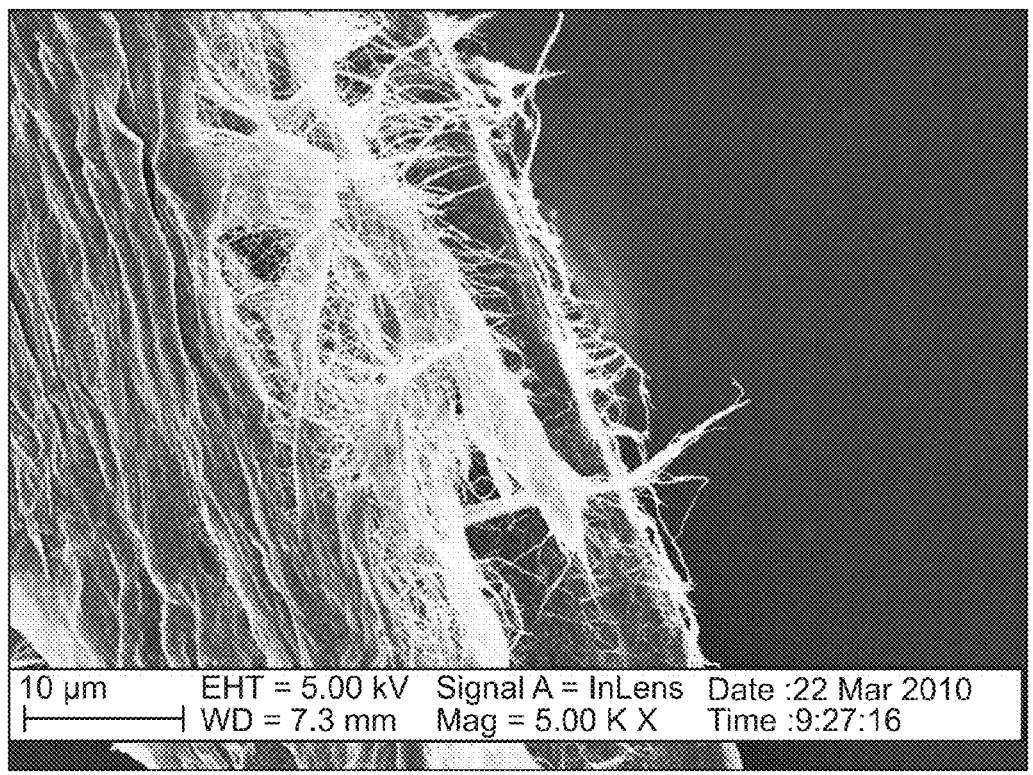
Figure 2A:
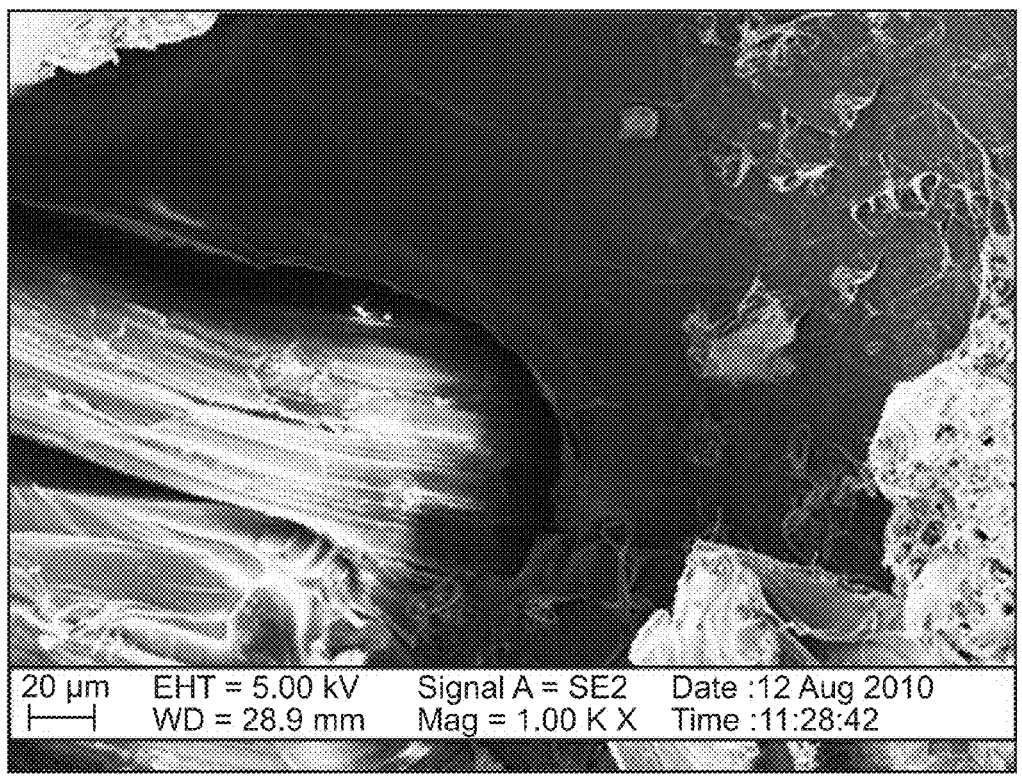
Figure 2B:
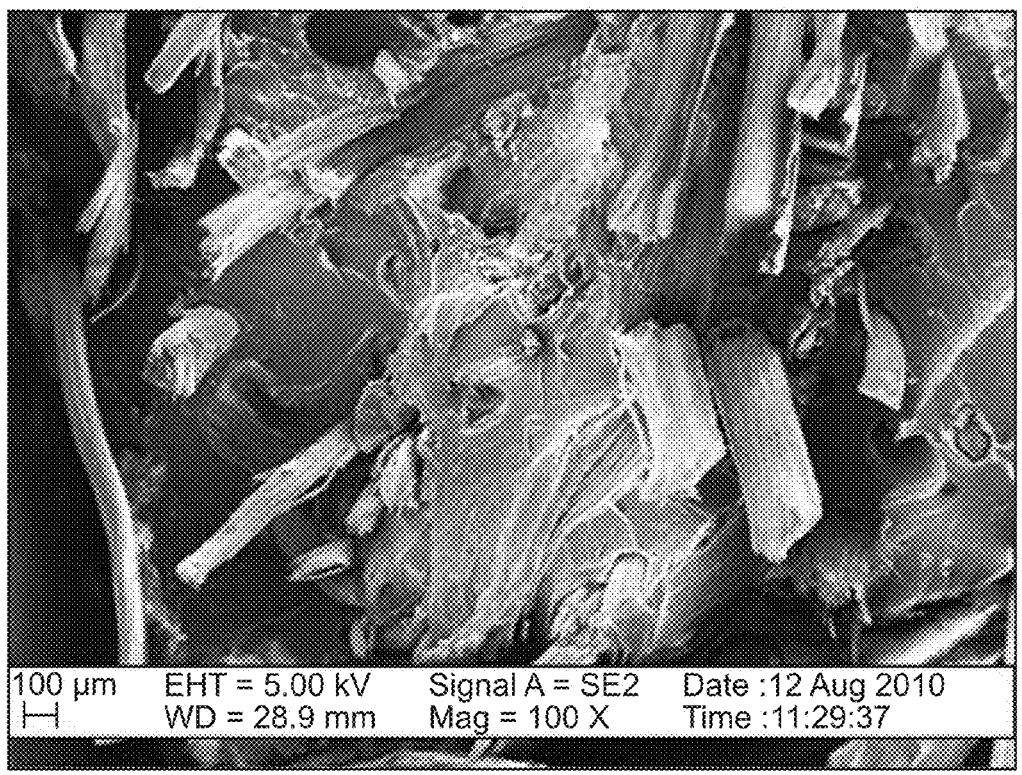
Figure 2C:
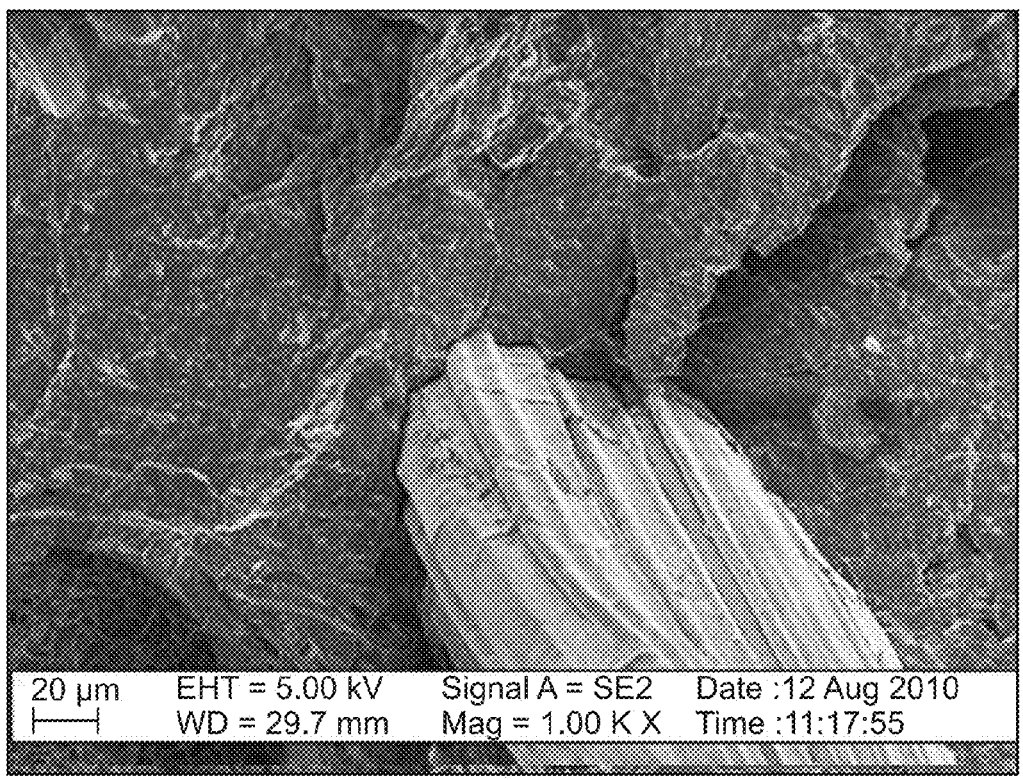
Figure 2D:
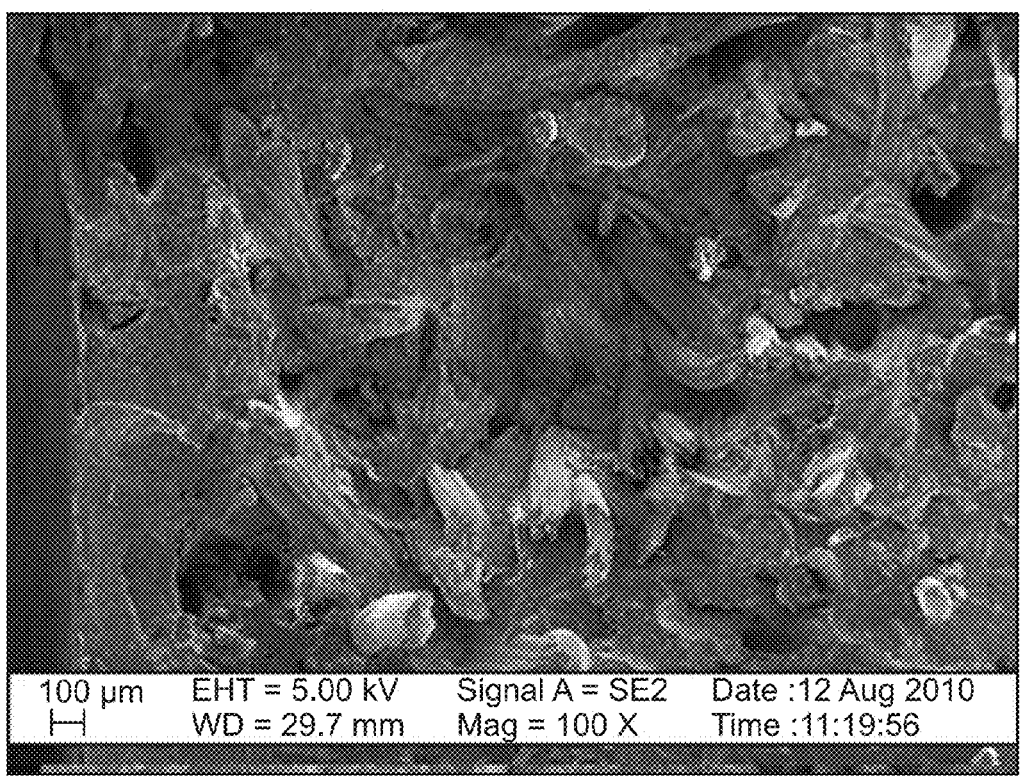
Figure 2E:
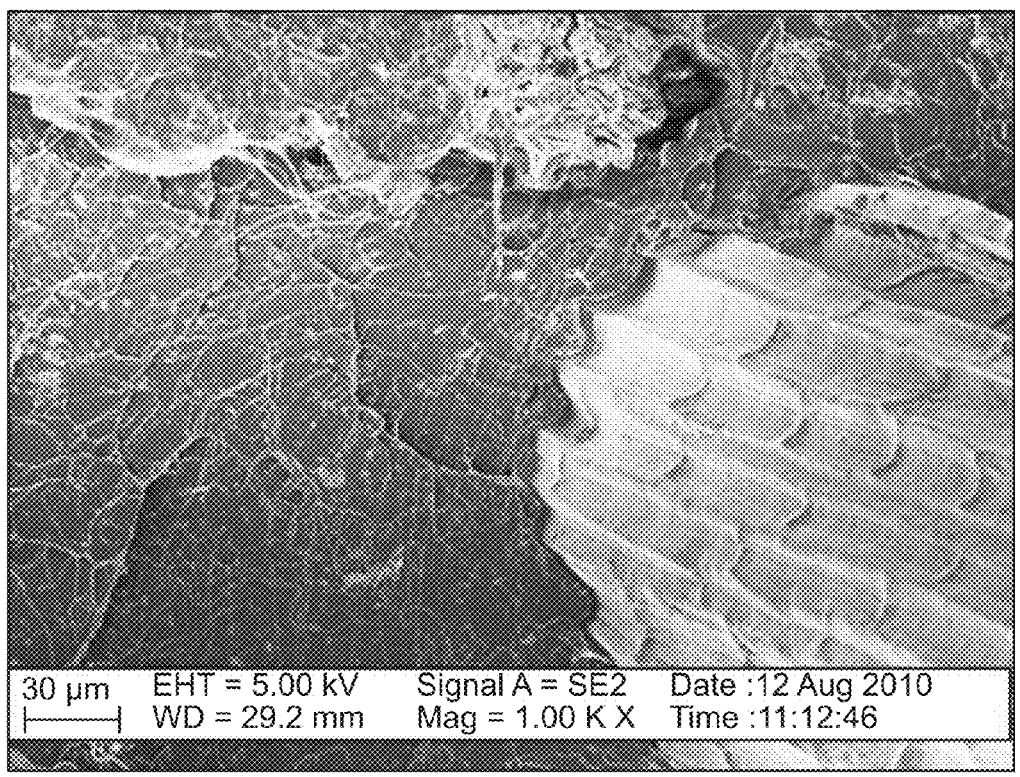
Figure 2F:
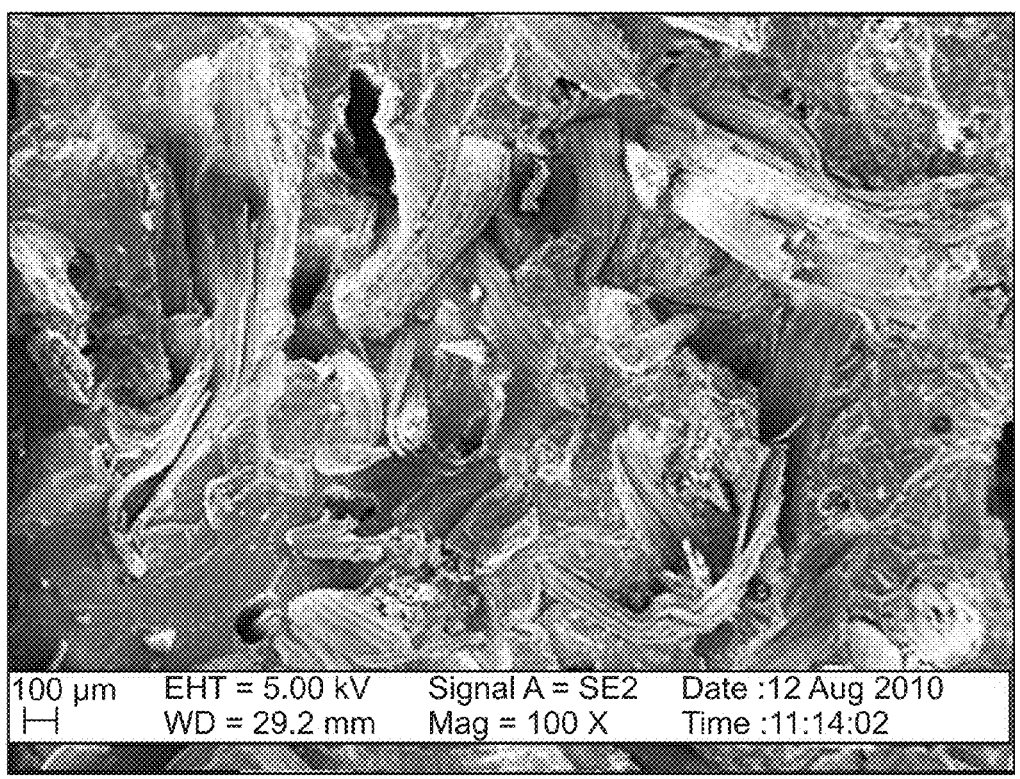
Figure 2G:
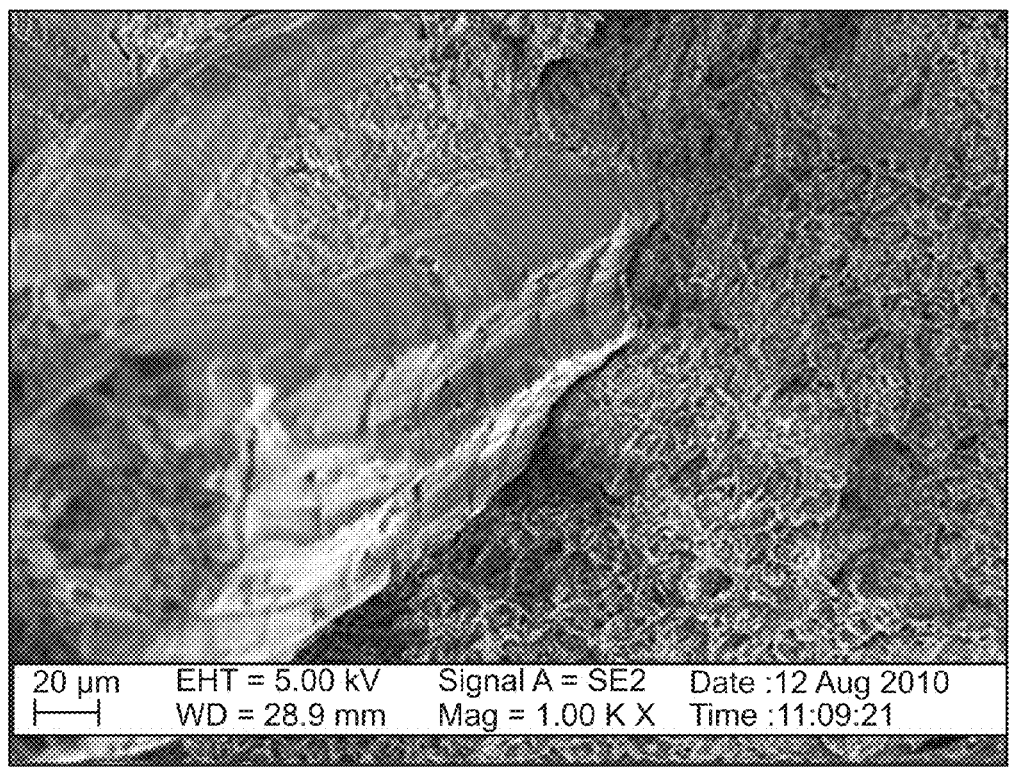
Figure 2H:
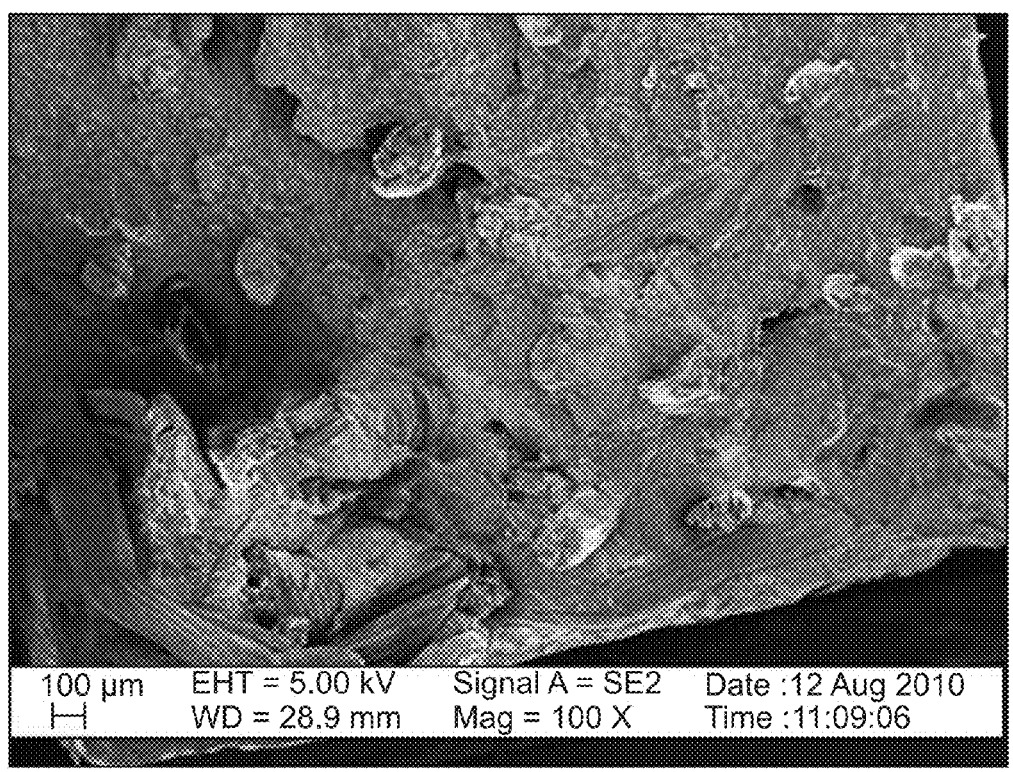
Figure 2I:
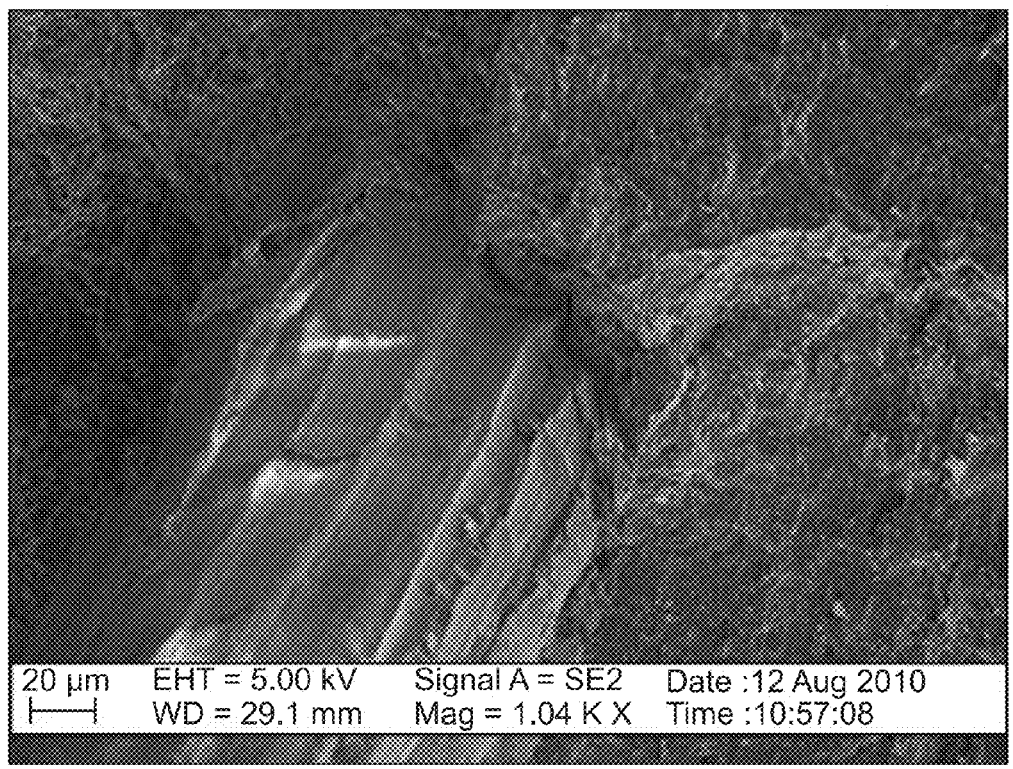
Figure 2J:
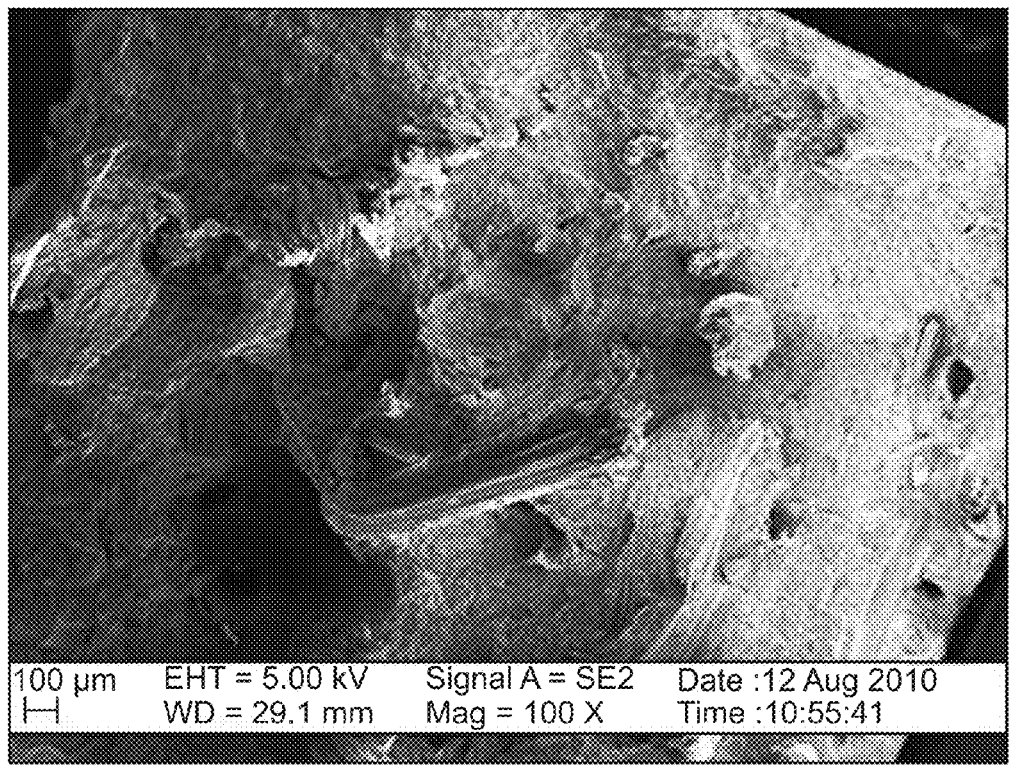
Figure 2K:
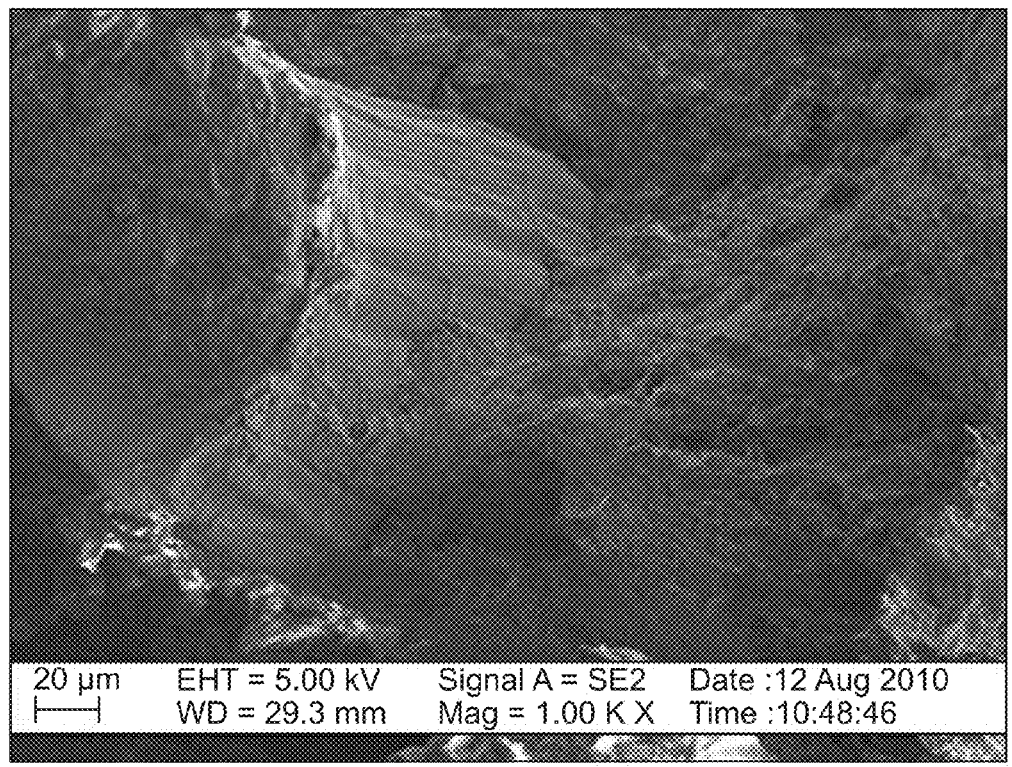
Figure 2L:
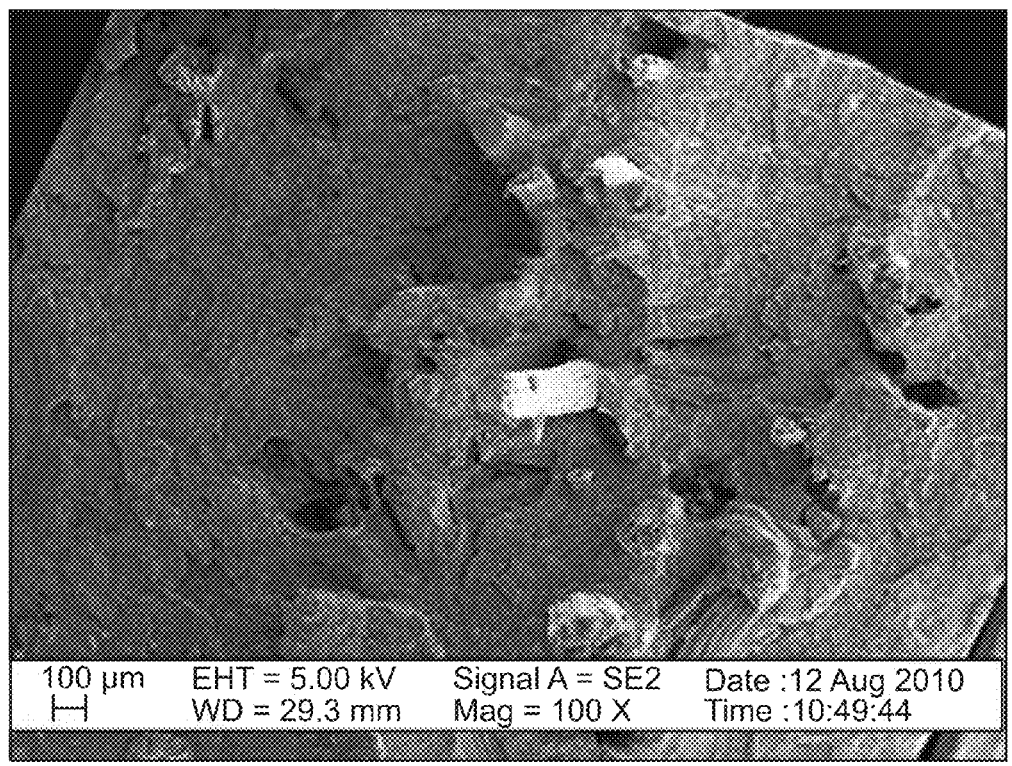

The present invention will now be illustrated by reference to one or more of the following non-limiting examples.

EXAMPLES

Materials

Poly(L-lactic acid) (PLLA) was purchased from Biomer GmbH (L9000, MW≥150 kDa, D-content≈1.5%) and was used as the matrix for the production of hierarchical composites. 1,4-Dioxane (Sigma-Aldrich, ACS Reagent, ≥99% purity) was used as the solvent to dissolve PLLA. Sodium hydroxide (purum grade, pellets) was purchased from Acros Organics. Loose sisal fibres were kindly supplied by Wigglesworth & Co. Ltd. (London, UK). These fibres were grown in East Africa. The harvested crop was left in the field for approximately 3 to 4 weeks for dew retting in order to allow the combined action of temperature, humidity and bacteria to loosen the fibres. After this retting process, the retted sisal fibres were placed in a rudimentary tool where the fibres were pulled out by hand, washed with water and sun-dried for a day. Bacterial cellulose (BC) was extracted from commercially available Nata-de-coco (CHAOKOH coconut gel in syrup, Ampol Food Processing Ltd, Nakorn Pathom, Thailand).

Extraction and Purification of BC

BC was extracted from 10 jars of Nata-de-coco, in batches of 5 jars. For every batch, the coconut gels from Nata-de-coco were rinsed three times with 5 L of de-ionised water to remove the sugar syrup and blended for 1 min using a laboratory blender (Waring Blender LB20EG, Christison Particle Technologies, Gateshead, UK). The blended BC was then homogenised in 5 L of water at 20,000 rpm for 2 min using a homogeniser (Polytron PT 10-35 GT, Kinematica, Switzerland) and centrifuged at 14,000 g to remove the excess sugar-water solution. In order to further purify the extracted cellulose, the centrifuged BC was redispersed in 5 L of 0.1 M NaOH solution heated to 80° C. for 20 min to remove any remaining microorganism and soluble polysaccharides. The purified BC was then successively centrifuged and homogenised to neutral pH with water using the previously described centrifugation-homogenisation step.

Example 1

Coating Sisal Fibres with Nano-Sized BC

A dispersion of 0.1 wt % BC was prepared by homogenising 0.3 g of BC (dry basis) in 300 mL of de-ionsed water. 0.5 g of sisal fibres were immersed and equilibrated in this dispersion for three days at room temperature. After three days of immersion, the fibres were removed from the BC-water dispersion and dried in two different ways to create (i) a dense (collapsed) BC coating or (ii) "hairy fibres", with a layer of BC coating oriented perpendicular away the fibre surface. To create a dense layer BC coating on the fibres, the wet fibres were dried under vacuum at 80° C. overnight. "Hairy fibres" were created by pressing the wet fibres between two filter papers (qualitative filter paper 413, 125 mm in diameter, particle retention of 5-13 μm, VWR, UK) under a weight of 3 kg for 10 s to partially dry them. The partially dried "hairy sisal fibres" were then dried in an air oven held at 40° C. The sisal fibres coated with a dense layer of BC are termed densely coated neat sisal fibres (DCNS) and the "hairy fibres" were termed "hairy neat sisal fibres" (HNSF).

Preparation of Hierarchical Short Fibre Composites

Two different types of hierarchical composites were prepared; (i) BC coated fibre reinforced PLLA and (ii) BC coated fibre reinforced BC PLLA nanocomposites. For simple hierarchical composites, 2.4 g of (coated) fibres, cut to approximately 10 mm in length, were added into 200 mL of 1,4-dioxane. 9.6 g of PLLA pellets were added into this mixture and left to dissolve overnight at 60° C. under magnetic stirring to create a 20 wt % fibre reinforcement in the matrix. The resulting mixture was then poured into a Petri dish and dried under vacuum (Edwards Modulyo freeze dryer, UK) at room temperature to remove any remaining solvent. The solvent was captured by a cold trap, which has the potential to be re-used in the polymer dissolution process. Hierarchical composites with BC dispersed in the PLLA matrix were prepared by immersing 1.8 g of (coated) fibres in 200 mL of 1,4-dioxane and 9.6 g of PLLA pellets were added. This mixture was left to dissolve overnight at 60'C under magnetic stirring. 0.6 g of freeze-dried BC was added into 150 mL of 1,4 dioxane in a separate beaker and homogenised at 20,000 rpm for 2 min. This BC dispersion was then added into the PLLA polymer solution containing sisal fibres and stirred gently to ensure homogeneous dispersion of BC in the fibre-polymer solution. This mixture was then vacuum dried at room temperature to remove any remaining solvent.

Production of Hierarchical Composites

The previously produced sisal fibres-PLLA-BC "prepregs" were injection moulded into flexural bars with a sample dimension of 80 mm×12 mm×3.5 mm using a piston injection moulder (Hakke Minijet, Thermo Scientific, Hampshire, UK). Tensile test specimens (BS ISO 527:1996 type V) was also injection moulded using the same piston injection moulder. The tensile dog bone test specimens have an overall length of 60 mm, gauge length of 10 mm, thickness of 3 mm and the narrowest part of the sample was 3 mm. The barrel temperature and the mould temperature were held at 190° C. and 70° C., respectively. Neat PLLA was injection moulded with an injection pressure and time of 400 bar and 30 s and a post-pressure and time of 200 bar and 30 s. (BC Coated) sisal fibres reinforced PLLA was injected with an injection pressure and time of 500 bar and 30 s and a post-pressure and time of 200 bar and 30 s. Due to the increase in viscosity of the polymer melt when BC was dispersed both on the surface of sisal fibres and in the PLLA matrix, the hierarchical composites with (BC coated) sisal fibre and BC dispersed in the matrix was injected with an injection pressure and time of 600 bar and 30 s and a post-pressure and time of 200 bar and 30 s.

Characterisation of BC Coated Sisal Fibres and its PLLA Hierarchical Composites

Scanning Electron Microscopy (SEM)

SEM was conducted to characterise the surface morphology of neat and BC coated sisal fibres. It was also used to characterise the fractured surface of the hierarchical composites. SEM was performed using a high-resolution field emission gun scanning electron microscope (LEO Gemini 1525 FEG-SEM, Oberkochen, Germany). The accelerating voltage used was 5 kV. Prior to SEM, all the samples were fixed onto SEM stubs using carbon tabs and coated with Cr for 1 min and 75 mA.

Specific Surface Area (BET) Measurements

Nitrogen adsorption/desorption isotherms were conducted to determine the specific surface area of neat and BC coated sisal fibres. This measurement was performed using a surface area and porosity analyser (TriStar 3000, Micrometerics Ltd, Dunstable, UK). The specific surface area was calculated using the Brunauer-Emmett-Teller (BET) equation. Prior to the measurement, the fibres were degassed at 80° C. overnight to remove any adsorbed water molecules.

Single Fibre Tensile Properties of Neat and BC Coated Sisal Fibres

Single fibre tensile tests were performed to investigate the effect of BC coating on the tensile properties of sisal fibres. The test was conducted at room temperature in accordance to ASTM D-3822-07, using a TST 350 tensile testing rig (Linkam Scientific Instrument Ltd, Surrey, UK) at room temperature equipped with 200 N load cell. The gauge length and crosshead speed used were 20 mm and 1 mm min$^{-1}$, respectively. A single sisal fibre was fixed at either end of a testing card using superglue. A total of 10 measurements were conducted for each type of fibre to obtain a statistical average. The fibre diameter was evaluated using an optical microscope (Olympus BX 41 M reflective microscope, Essex, UK) and the tensile properties of the fibres were calculated by assuming the fibres possessed a cylindrical geometry.

Mechanical Properties of the Hierarchical Composites

Tensile and flexural (3-point bending) properties of sisal fibre reinforced PLLA hierarchical composites were conducted in accordance to BS EN ISO 527: 1996 and BS EN ISO 178: 2003, respectively. The tests were performed using an Instron universal testing machine (Instron 4466, Instron Corporation, Massachusetts, USA) with a load cell of 10 kN at room temperature and 50% relative humidity. The testing speed used for tensile and flexural tests were 1 mm min$^{-1}$ and 20 mm min$^{-1}$, respectively. A span of 55 mm (span to thickness ratio=16) was used for flexural test.

Differential Scanning Calorimetry (DSC) of Hierarchical Composites

The crystallisation and melt behaviour of (BC coated) fibre reinforced PLLA hierarchical (nano)composites were investigated using DSC (DSC Q2000, TA Instruments, West Sussex, UK) in a He atmosphere. Approximately 20 mg of sample was used in the measurement. A heat-cool-heat regime was employed during the test. The sample was first heated from room temperature to 210° C. at a heating rate of 10° C. min$^{-1}$ before cooling it to room temperature at a cooling rate of 50° C. min$^{-1}$. The sample was then re-heated to 210° C. at a heating rate of 10° C. min$^{-1}$. The crystallinity (based on 1$^{st}$ heating curve) of the composites produced was calculated using the equation:

$$\chi_C = \frac{\Delta H_m - \Delta H_c}{(1-f)\Delta H_m^o} \times 100\% \qquad [1]$$

where $\chi_c$ is the crystallinity of the composite, $\Delta H_m$, $\Delta H_c$, f and $\Delta H_m^o$ are the melting enthalpy and cold crystallisation enthalpy determined from DSC curves, weight fraction of the reinforcing phase (20 wt %) and the melting enthalpy of pure crystalline PLLA (93.76 J g$^{-1}$ (Mathew A P, Oksman K, Sain M. J Appl Polym Sci. 2006; 101(1):300-310)), respectively.

Dynamic Mechanical Analysis (DMA) of the Hierarchical Composites

The visco-elastic behaviour of the composites was investigated using DMA (Tritec 2000, Triton Technology Ltd, Keyworth, UK). DMA was performed in single beam cantilever bending mode with a gauge length of 10 mm. The sample has a thickness and width of approximately 3 mm. The storage modulus, loss modulus and energy dissipation factor (tan δ) were measured from 30° C. to 100° C. at a heating rate of 2° C. min$^{-1}$ and a frequency of 1 Hz.

Results and Discussion

Morphology of BC Coated Sisal Fibres

FIG. 1 shows the SEM images of neat sisal fibres, densely BC coated sisal fibres and "hairy BC coated sisal fibres". The morphology of densely coated sisal fibres with BC (FIG. 1b and FIG. 1c) resembles the BC coated fibres obtained by culturing the fibres with Acetobacter in a bioreactor (Pommet M, Juntaro J, Heng J Y Y, Mantalaris A, Lee A F, Wilson K, et al. Biomacromolecules. 2008; 9(6): 1643-1651). In addition to this, it was also possible to obtain true "hairy BC coated sisal fibres" (FIG. 1d). The loading fraction of BC on sisal fibres was found to be 10 wt % (by measuring the mass of dry sisal fibres before and after immersion in BC dispersion in both DCNS and HNSF). The fast drying rate of the coated fibres under vacuum resulted in the collapsing of BC nanofibrils onto the surface of sisal fibres (FIG. 1b and FIG. 1c). By pressing the wet BC coated sisal fibres between filter papers, the fibres were partially dried by filter papers. During this process, the wet BC nanofibrils were drawn into the filter paper by the capillary forces. Combining this with the slow drying rate of the coated fibres (which prevents the collapse of the nanofibrils), the BC coating is now not arranged in a dense layer but the BC nanofibrils were oriented perpendicularly ("hairy fibres") to the surface of sisal fibres.

BET Surface Area of BC Coated Sisal Fibres

TABLE 1

| Sample | BET surface area (m$^2$ g$^{-1}$) | Single fibre tensile properties | |
|---|---|---|---|
| | | Tensile modulus (GPa) | Tensile Strength (MPa) |
| Neat sisal fibres | 0.097 ± 0.008 | 23.2 ± 3.3 | 529 ± 91 |
| DCNS fibres | 0.770 ± 0.030 | 14.1 ± 1.5 | 297 ± 30 |
| HNSF fibres | 0.485 ± 0.029 | 23.3 ± 2.8 | 474 ± 53 |

Table 1: BET surface area, single fibre tensile modulus and tensile strength of neat and BC coated sisal fibres; dense layer and "hairy fibres", respectively Table 1 tabulates the measured BET surface area of neat and BC coated sisal fibres. The surface area of BC coated fibres can be increased by as much as 8 times when compared to neat sisal fibre. Hairy fibres have a lower surface area than DCNS even though both types of fibres have similar BC loading.

Tensile Properties of Neat and BC Coated Sisal Fibres

Chemically treated natural fibres generally have reduced single fibre tensile properties (Kalia S, Kaith B S, Kaur I. Pretreatments of Natural Fibers and their Application as Reinforcing Material in Polymer Composites—A Review. Polym Eng Sci. 2009; 49(7):1253-1272). Pickering K L, Li Y, Farrell R L, Lay M. Interfacial modification of hemp fiber reinforced composites using fungal and alkali treatment. J Biobased Mater Bioenergy. 2007; 1(1):109-117 studied the effect of enzyme treatment on the properties of single hemp fibres. The authors showed that the single fibre tensile strength of enzyme treated hemp fibres decreased by as much as 50% compared to untreated fibres. The single fibre tensile properties of neat and BC coated sisal fibres are shown in Table 1. The tensile properties of neat sisal fibres in this study is in agreement with values obtained by various researchers in the literature (Bismarck A, Mishra S, Lampke T. Plant fibers as reinforcement for green composites. In: Mohanty A K, Misra M, Drzal L, editors. Natural fibers, biopolymers and biocomposites, Boca Raton: CRC Press; 2005).

When sisal fibres are coated with a dense layer of BC (DCNS), its fibre tensile modulus and tensile strength decreased by 40% and 45%, respectively. The fibre's tensile modulus remained unchanged and the fibre's tensile strength reduced only by 10% (but still within the error of neat sisal fibres) when the fibres are wet pressed between filter papers to create "hairy sisal fibres".

Mechanical Properties of Composites

In order to investigate the effect of BC coating on the mechanical properties of sisal fibre reinforced PLLA hierarchical composites, tensile and flexural tests were conducted. These results are shown in Table 2

TABLE 2

| Sample | $E_T$ (GPa) | $\sigma_T$ (MPa) | $E_F$ (GPa) | $\sigma_F$ (MPa) |
|---|---|---|---|---|
| Neat PLLA | 0.97 ± 0.02 | 62.6 ± 1.0 | 3.70 ± 0.04 | 86.1 ± 6.9 |
| PLLA-sisal | 1.28 ± 0.03 | 58.7 ± 1.0 | 4.85 ± 0.10 | 105.6 ± 1.5 |
| PLLA-DCNS | 1.35 ± 0.03 | 57.3 ± 1.3 | 5.19 ± 0.07 | 99.2 ± 2.8 |
| PLLA-HNSF | 1.29 ± 0.03 | 57.8 ± 1.6 | 4.96 ± 0.16 | 102.0 ± 2.5 |
| PLLA-sisal-BC | 1.46 ± 0.02 | 60.9 ± 1.9 | 5.74 ± 0.05 | 100.0 ± 2.2 |
| PLLA-DCNS-BC | 1.63 ± 0.04 | 67.8 ± 1.2 | 6.19 ± 0.08 | 95.5 ± 2.3 |
| PLLA-HNSF-BC | 1.59 ± 0.05 | 69.2 ± 1.2 | 5.77 ± 0.13 | 96.8 ± 2.0 |

Table 2: Summary of mechanical properties of neat PLLA and its components $E_T$, $\sigma_T$, $E_F$, $\sigma_F$ indicate tensile modulus, tensile strength, flexural modulus and flexural strength, respectively.

It can be seen that with (BC coated) sisal fibre as reinforcement, the tensile moduli for all samples increased. The increase in tensile modulus of the hierarchical composites was more apparent when BC is both dispersed in the matrix and coated on sisal fibres (PLLA-sisal-BC, PLLA-DCNS-BC and PLLA-HNSF-BC). With BC dispersed in the matrix and on the fibres, both the matrix and the fibre-matrix interface could be reinforced (or stiffened). This led to the observed improvements in tensile modulus of PLLA-DCNS-BC by as much as 72% when compared to neat PLLA and 30% when compared to PLLA-sisal hierarchical composites.

The tensile strength of the hierarchical composites, on the other hand, showed slightly different trend compared to tensile modulus. A decrease in tensile strength was observed when PLLA is reinforced with (BC coated) sisal fibres, with no BC dispersed in the matrix. When the hierarchical composites are reinforced with BC in the PLLA matrix (PLLA-HNSF-BC), the tensile strength improved by as much as 11% when compared to neat PLLA and 21% when compared to PLLA-DCNS. With BC dispersed in the matrix, the matrix is stiffened.

Table 2 shows the flexural properties of the composites. It can be seen that the flexural modulus increased with fibre/BC reinforcement. The flexural modulus of the hierarchical composites with BC dispersed in the matrix (PLLA-DCNS-BC) improved by as much as 67% when compared to neat PLLA and 40% when compared to hierarchical composites without BC dispersed in the matrix. As aforementioned, this is due to matrix stiffening effect induced by nano-sized reinforcement in PLLA matrix. The flexural strength of the all the composites increased when compared to neat PLLA. An increase in flexural strength by as much as 23% was observed. It seems, however, that the BC coating on sisal fibres and/or in the matrix has no effect on the overall flexural strength of the composites. Due to the low fibre volume fraction of short fibre composites, individual fibre failure is isolated and therefore, microbuckle bands and kinkbands do not form (Greenhalgh E S. Failure analysis and fractography of polymer composites. Cambridge: Woodhead Publishing Ltd and CRC Press LLC; 2009.). Instead, a shear failure of short-fibre composites is usually observed. Flexural failure of short-fibre composites is accompanied by tension on the bottom surface and compression on the top surface of the specimens (Jeng C C, Chen M. Flexural failure mechanisms in injection-moulded carbon fibre/PEEK composites. Compos Sci Technol. 2000; 60(9):1863-1872), which results in shear fracture in the mid-section of the specimen.

Fractography of Hierarchical Composites

The fractured surface of the composites failed in tension is shown in FIG. 2. When PLLA is reinforced by sisal fibres, fibre debonding (FIG. 2a) and fibre pull out can be clearly seen (FIG. 2b). This is a direct result in poor interfacial adhesion between the fibre and the matrix, which results in the poor stress transfer. This resulted in poor tensile strength of PLLA-sisal when compared to neat PLLA. When sisal fibres are coated with BC, the fibre-matrix is improved as no fibre debonding can be observed (FIG. 2c-f). Single fibre pull out study in previous study (Pommet M, Juntaro J, Heng J Y Y, Mantalaris A, Lee A F, Wilson K, et al. Surface modification of natural fibers using bacteria: Depositing bacterial cellulose onto natural fibers to create hierarchical fiber reinforced nanocomposites. Biomacromolecules. 2008; 9(6):1643-1651) has also shown the interfacial adhesion between the BC coated fibre and PLLA matrix is enhanced. Even though no fibre debonding was observed, the tensile strength of PLLA-DCNS and PLLA-PCNS decreased when compared to neat PLLA. Failures in short-fibre composites can be classified into two types; T-fibre fracture (crack plane oriented transverse to fibre orientation—high fracture energy) and L-fibre fracture (crack plane oriented parallel to fibre orientation—low fracture energy) (Greenhalgh E S. Failure analysis and fractography of polymer composites. Cambridge: Woodhead Publishing Ltd and CRC Press LLC; 2009). In general, short-fibre composites exhibit a combination of fractured failures. The overall fractured surface of PLLA-DCNS and PLLA-HNSF showed L-fibre fractured surface as the dominant mechanism. This explained the poor tensile strengths of these composites even though the fibre-matrix interface is enhanced through mechanical interlock. However, when BC is dispersed in the fibre reinforced PLLA composites, the overall fractured surface and hence, fractured mechanism, was modified. No significant fibre debonding or fibre pull out can be observed in PLLA-sisal- BC, PLLA-DCNS-BC and PLLA-HNSF-BC composites in FIG. 2g-l. This is accompanied by the improved mechanical properties (both tensile strength and modulus) of the hierarchical composites when compared to neat PLLA.

Crystallisation and Melt Behaviour of the Hierarchical Composites

The thermal behaviour of the composites were characterised by DSC and their characteristic temperatures such as glass transition temperatures ($T_g$), crystallisation temperatures ($T_c$) and melt temperature ($T_m$) on the first and second heating are tabulated in Table 3.

TABLE 3

| Sample | Heating | $T_g$ (° C.) | $T_c$ (° C.) | $T_m$ (° C.) | $\chi_c$ (%) |
|---|---|---|---|---|---|
| PLLA | 1st | 63 | 113 | 171 | 14 |
|  | 2nd | 61 | 110 | 169 |  |
| PLLA-sisal | 1st | 57 | 100 | 168 | 17 |
|  | 2nd | 59 | 103 | 168 |  |
| PLLA-DCNS | 1st | 57 | 88 | 168 | 13 |
|  | 2nd | 62 | 93 | 169 |  |
| PLLA-HNSF | 1st | 57 | 94 | 166 | 12 |
|  | 2nd | 57 | 94 | 166 |  |
| PLLA-sisal-BC | 1st | 55 | 83 | 165 | 18 |
|  | 2nd | — | — | 168 |  |
| PLLA-DCNS-BC | 1st | 56 | 85 | 163 | 14 |
|  | 2nd | — | — | 166 |  |
| PLLA-HNSF-BC | 1st | 54 | 81 | 165 | 19 |
|  | 2nd | — | — | 167 |  |

Table 3: Crystallisation and melt behavior of neat PLLA and its fibre/BC reinforced hierarchical composites. $T_g$, $T_c$, $T_m$ and $\chi_c$ are glass transition temperature, crystallisation temperature, melt temperature and crystallinity of the composites, respectively.

The $T_g$ of PLLA in the composites was slightly lower when compared to neat PLLA. There are also no significant changes in the melt temperature of the composites but the crystallisation behaviour of the composites changed significantly compared to neat PLLA. A lowering of $T_c$ can be observed in composites reinforced with sisal fibres. Cellulosic fibres are known to act as a nucleation sites for PLLA crystallisation (Suryanegara L, Nakagaito A N, Yano H. The effect of crystallization of PLA on the thermal and mechanical properties of microfibrillated cellulose-reinforced PLA composites. Compos Sci Technol. 2009; 69(7-8):1187-1192). With BC coating on sisal fibres, $T_c$ was lowered even further from 100° C. to 90° C. BET measurements showed an increase in the surface area of coated fibres. This led to more nucleation sites for PLLA crystals to nucleate and therefore, the further lowering of $T_c$. It should also be noted that there are no $T_g$ or $T_c$ observed in the second heating of the hierarchical composites with a BC reinforced matrix. The crystallinity of the composites did not seem to be affected with the addition of sisal fibres and/or BC. An exotherm was observed around 150° C. (results not shown). This is consistent with the solid-solid crystal transformation of the α' form to the α form of PLLA (Kawai T, Rahman N, Matsuba G, Nishida K, Kanaya T, Nakano M, et al. Crystallization and melting behavior of poly (L-lactic acid). Macromolecules. 2007; 40(26):9463-9469).

Visco-Elastic Behaviour of Hierarchical Composites

Figure 3:
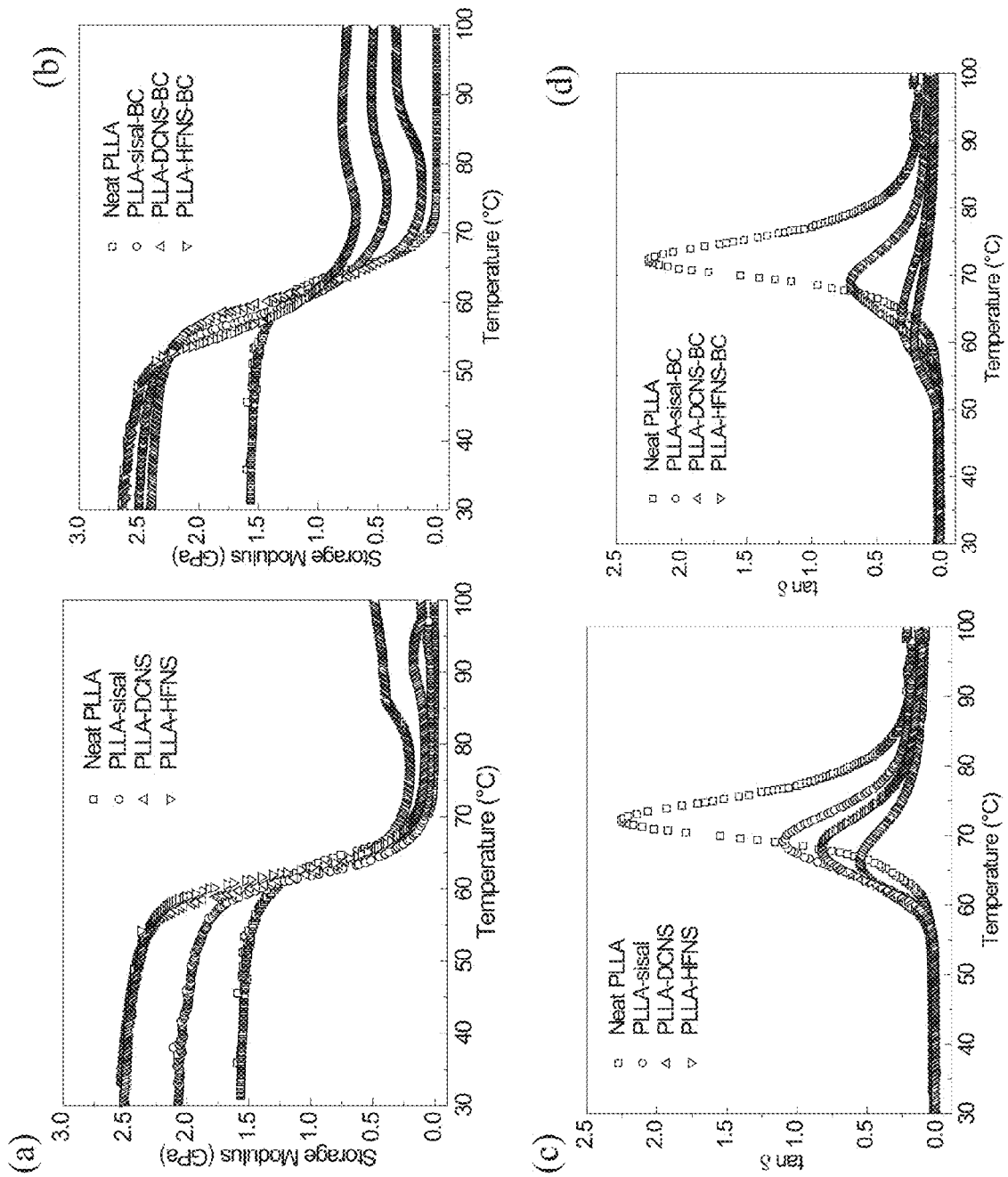

The visco-elastic properties of neat PLLA and its hierarchical composites as a function of temperature are shown in FIG. 3. The storage moduli of the hierarchical composites are higher than that of neat PLLA. By reinforcing PLLA with BC and/or sisal fibres, a stiffer material can be produced. This result corroborates with the tensile and flexural moduli, which suggests that the (BC coated) sisal fibres have a strong influence on the visco-elastic properties of the resulting (nano)composites. The storage moduli stayed relatively constant until $T_g$, when a sharp decrease can be seen. This corresponds to the softening of the polymer. It can also be seen that by coating the surface of sisal fibres with BC or dispersing BC in the polymer matrix, the storage modulus can be improved when compared to neat PLLA (by at least 52%) or neat sisal reinforced PLLA composites (by at least 15%). Different visco-elastic behaviour between composites with and without BC dispersed in the matrix (FIG. 3a-b) can also be observed beyond the mechanical $T_g$ of the hierarchical composites. Crystallisation of the matrix occurred at lower temperatures when BC was dispersed in the matrix.

The tan δ of neat PLLA and its hierarchical composites are shown in FIG. 3c-d. Tan δ, which measures the damping properties of the material, is also determined by the quality of fibre-matrix adhesion Baltazar-y-Jimenez A, Juntaro J, Bismarck A. J Biobased Mater Bioenergy. 2008; 2(3):264-272). A large tan δ amplitude indicates a weak interface where a small tan δ amplitude indicates stronger interface (van den Oever M J A, Bos H L, van Kemenade M. Appl Compos Mater. 2000; 7(5-6):387-402). The amplitude of tan δ is lower for BC coated sisal fibre reinforced PLLA and composites with BC dispersed in the matrix. Table 4 tabulates the mechanical T, (taken as the peak of tan δ) and improvements in storage moduli as a result of BC and fibre reinforcement.

TABLE 4

| Sample | Mechanical $T_g$ (° C.) | G' @ 30° C. (GPa) | Improvements in G' over neat PLLA (%) |
|---|---|---|---|
| PLLA | 73 | 1.57 | — |
| PLLA-sisal | 69 | 2.07 | 32 |
| PLLA-DCNS | 68 | 2.52 | 61 |
| PLLA-HNSF | 66 | 2.52 | 61 |
| PLLA-sisal-BC | 63 | 2.49 | 59 |
| PLLA-DCNS-BC | 69 | 2.39 | 52 |
| PLLA-HNSF-BC | 61 | 2.64 | 69 |

Table 4: Mechanical $T_g$, storage moduli (G') and improvements in storage moduli of the hierarchical composites.

The mechanical $T_g$ of PLLA was determined to be 73° C. and decreased with BC/fibre reinforcement. This result also corroborates with DSC, as it shows lowering of $T_g$. DMA results showed an improved fibre-matrix interface as a result of BC coating/dispersion.

The present application therefore discloses the production of randomly oriented short sisal fibre reinforced PLLA hierarchical composites with improved properties over neat PLLA. The application discloses a novel method of producing a surface coated support material based on slurry dipping to coat in particular sisal fibres with nano-sized bacterial cellulose. This process provides a cost effective and alternative method to modify the surface of fibres. This process can be used to produce either a dense nanocellulose coating layer on the surface of sisal fibres or nanocellulose coated hairy fibres, in which the nanocellulose is oriented perpendicularly to the surface of the fibres. BET surface area measurements showed an increase in surface area of the fibres by as much as 800% when compared to neat sisal fibres. The flexural modulus of the composites using the surface coated support material improved by as much as 67% and their flexural strength increased by 23% when compared to neat PLLA. DMA also suggests an enhanced fibre-matrix interface (a reduction in the height of tan δ) and higher storage moduli when compared to neat PLLA. This new type of short fibre composites offers a promising alternative (on the basis of cost versus performance) to the industry as no chemical modifications or plasma treatments are required to produce biodegradable composites with improved properties.

Example 2

Figure 4:
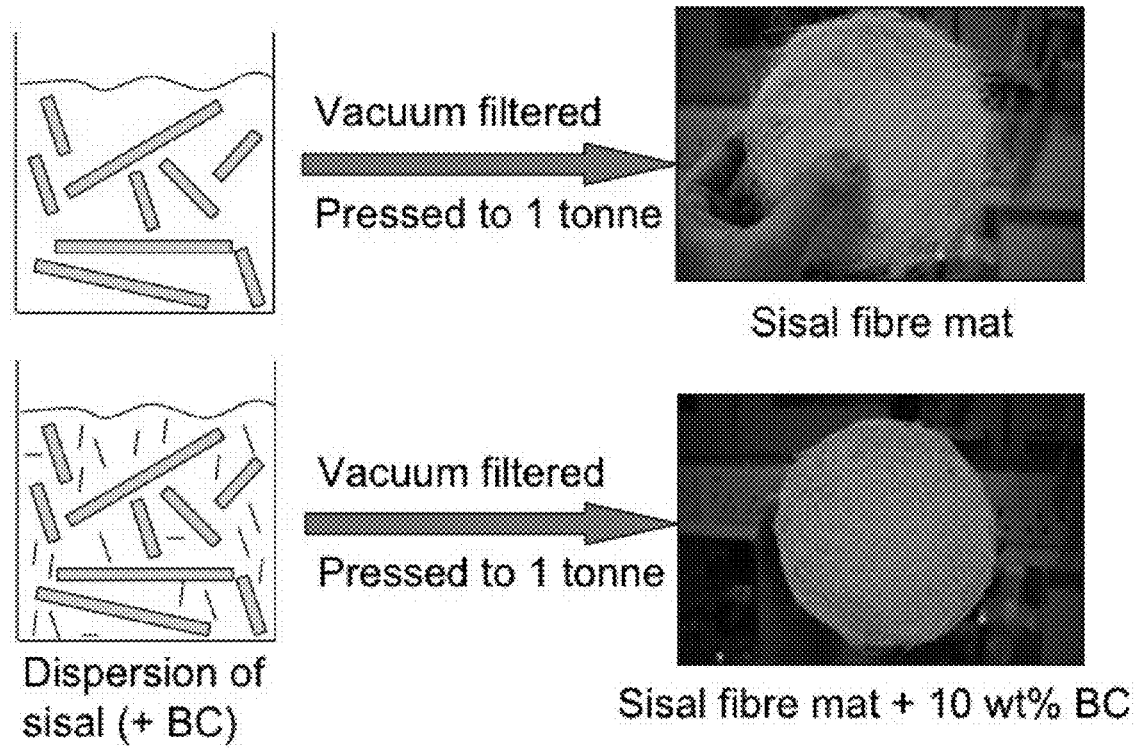
FIG. 4 illustrates a schematic of a method for producing a sisal fibre mat and a sisal fibre mat using bacterial cellulose (BC) as a binder.

Production of Sisal Fibre Mat with and without Utilising BC as the Binder 16 g of sisal fibres, cut into 10 mm in length, were immersed into 2 L of de-ionised water and left for 24 hours for complete swelling of fibres. In order to produce fibre preforms made of sisal fibres, this dispersion of fibres was filtered under vacuum using filter paper (qualitative filter paper 413, particle retention of 5-13 µm, 125 mm in diameter, VWR, UK). The filter cake was then removed and pressed under a weight of 1 t for 2 min. This process was repeated prior to drying of the fibres in at oven held at 60° C. overnight. Fibre preforms utilising BC as binder to bind the sisal fibres together was also produced. Firstly, 1.7 g of BC (on a dry weight basis) was homogenised at 20,000 rpm in 2 L of water for 2 min. 16 g of sisal fibres, cut into 10 mm in length were immersed into this BC-water dispersion and left for 24 hours for complete swelling of the fibres. The sisal fibre volume fraction is 90 wt.-%. This BC-sisal fibre-water dispersion was then filtered under vacuum, pressed twice under a weight of 1 t for 2 min and dried in an oven overnight held at 60° C. A schematic of this fibre mat-making process is shown in FIG. 4.

Production of Randomly Oriented Sisal Fibre Mat Reinforced Acrylated Epoxidised Soybean Oil (AESO) Composites The fibre reinforced (nano)composites were manufactured using vacuum assisted resin infusion. AESO resin was mixed with 5 wt.-% of initiator (Luperox P, purity>98%, Aldrich, UK) relative to the mass AESO. The degassing of the resin was performed at 80° C. under vacuum. At this temperature, the polymerisation reaction will not proceed, as the thermal initiation temperature of the initiator is 104° C. Prior to resin infusion, the fibre mats (with and without BC as the binder) was further dried at 120° C. under a weight of 250 kg for 15 min. The fibre preforms were vacuum bagged on a one-sided mould, i.e. the tooling side and AESO was drawn into the vacuum bag under the driving force created by vacuum. The resin and the vacuum bagging were held at 80° C. during the infusion process to reduce the viscosity of AESO. The resin was then cured at 110° C. for 2 h and post cured at 130° C. for another 2 h prior to cooling down to room temperature overnight. During the curing process, the vacuum bagging was left under vacuum to improve consolidation of the composites. The resulting fibre reinforced composites possess a total fibre volume fraction of 40 vol.-%. Neat AESO was polymerised in a rectangle mould under identical conditions. Composites reinforced with sisal fibres and sisal fibres with BC as the binder are termed AESO-Sisal and AESO-Sisal-BC, respectively.

Characterisation

Mechanical Properties of the Sisal Fibre Reinforced (Nano) Composites

Tensile and flexural (3-point bending) properties of the sisal fibre reinforced AESO (nano)composites were conducted in accordance to ASTM D3039 and ASTM D790, respectively.

The tests were performed using an Instron universal testing machine (Instron 4505, Instron Corporation, Massachusetts, USA) with load cells of 10 kN (for tensile test) and 1 kN (for flexural test), respectively, at room temperature. Prior to the tests, the (nano)composites were cut into dimensions of 120 mm×15 mm×3 mm for tensile tests and 80 mm×15 mm×3 mm for flexural tests, respectively. Glass fibre reinforced composites was used as the end tabs for the tensile test specimens. The gauge length used for tensile tests and the span for flexural test were both 60 mm. The testing speed used was 1 mm min$^{-1}$ for all tests. Strain gauges (FLA-2-11, Techni Measure, Warwickshire, UK) were used in tensile tests to provide accurate description of the sample strain. A total of 5 samples were tested for each specimen.

Dynamic Mechanical Analysis (DMA) of the Sisal Fibre Reinforced (Nano)Composites The visco-elastic behaviour of the (nano)composites was investigated using DMA (Tritec 2000, Triton Technology Ltd, Keyworth, UK). DMA was performed in single beam cantilever bending mode with a gauge length of 10 mm. The sample has a thickness and width of approximately 3 mm. The storage modulus, loss modulus and energy dissipation factor (tan δ) were measured from −100° C. to 180° C. at a heating rate of 5° C. min$^{-1}$ and a frequency of 1 Hz.

Results and Discussion

Mechanical Properties of Sisal Fibre Reinforced (Nano) Composites

In order to investigate the effect of utilising BC as the binder for sisal fibres on the mechanical properties of sisal fibre reinforced AESO composites, tensile and flexural tests were conducted and the results are shown in Table 5.

TABLE 5

Mechanical properties of neat AESO and its fibre reinforced (nano)composites. $E_T$, $\sigma_T$, $E_F$ and $\sigma_T$ indicate tensile modulus, tensile strength, flexural modulus and flexural strength, respectively.

| Sample | $E_T$ (GPa) | $\sigma_T$ (MPa) | $E_F$ (GPa) | $\sigma_F$ (MPa) |
|---|---|---|---|---|
| Neat AESO | 0.40 ± 0.01 | 4.1 ± 0.1 | 0.57 ± 0.03 | 28.9 ± 0.2 |
| AESO - Sisal | 3.17 ± 0.19 | 18.4 ± 0.9 | 6.07 ± 0.49 | 95.3 ± 4.1 |
| AESO - Sisal - BC | 5.63 ± 0.39 | 31.4 ± 0.5 | 13.03 ± 0.91 | 177.7 ± 10.5 |

It can be seen from this table that the use of BC as the binder has positive impact on both the tensile and flexural properties of the composites. The tensile modulus of AESO-sisal improved by 7 times compared to neat AESO. When BC was used as the binder (AESO-sisal-BC), the tensile modulus improved by 13 times compared to neat AESO and 77% compared to AESO-sisal. The tensile strength of the (nano)composites showed similar trend as well, whereby AESO-sisal-BC showed an improvement of 400% and 73%, respectively compared to neat AESO and AESO-sisal. Improvements in the mechanical properties of the composites are not limited to the tensile properties only. The flexural properties of the sisal fibre reinforced (nano)composites also showed significant improvement over neat AESO (see table 5). When BC is used as the binder, the flexural modulus and strength of the (nano)composites improved by 22 times and 114%, respectively compared to neat AESO, and 200% and 86%, respectively when compared to AESO-sisal. The observed improvement can be attributed (i) enhanced stress transfer among the fibre mats when BC was used as the binder and (ii) the use of BC as the nano-reinforcement for AESO that stiffens the matrix, which was estimated to posses a Young's modulus of 114 GPa.

Visco-Elastic Behaviour of Sisal Fibre-Reinforced (Nano) Composites

Figure 5:
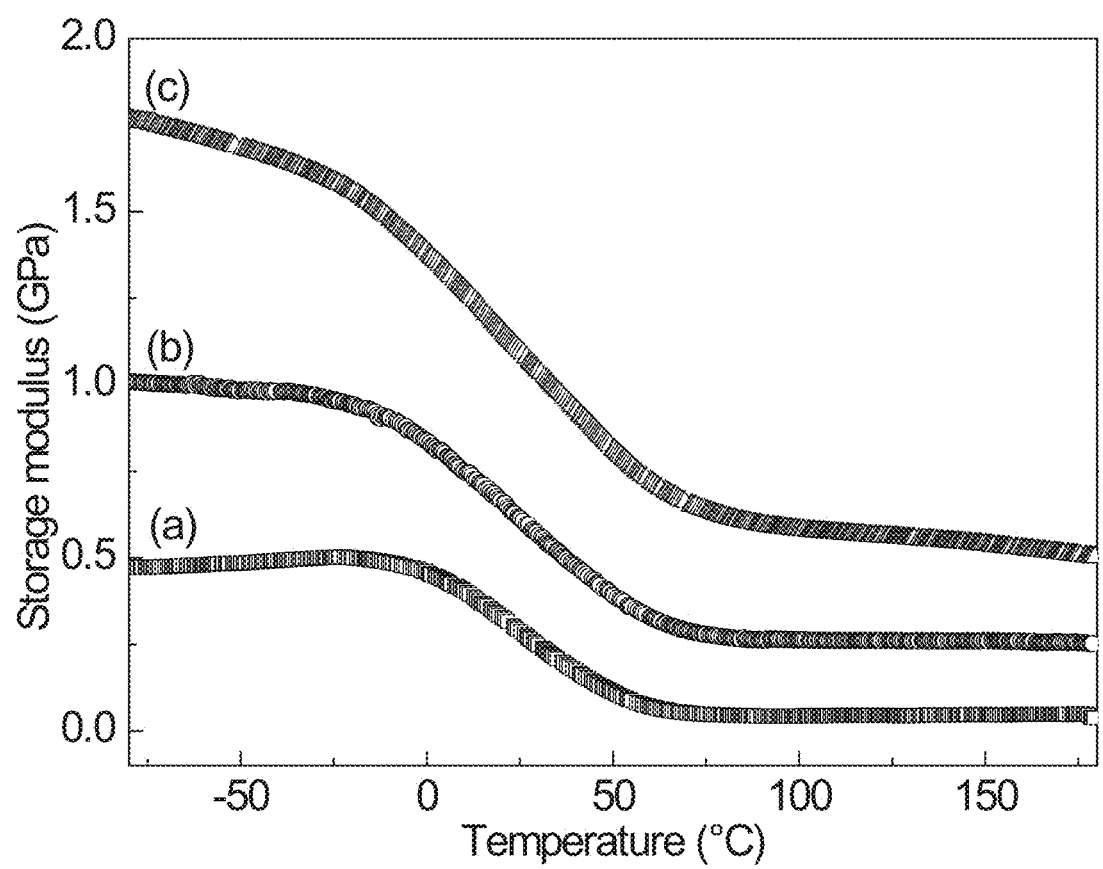
FIG. 5 illustrates the storage modulus of (a) neat AESO, (b) AESO-sisal, and (c) AESO-sisal-BC as a function of room temperature.

The visco-elastic properties of neat AESO and its sisal fibre reinforced nanocomposites are shown in FIG. 5. From this figure, it can be seen that the storage moduli of the (nano)composites is higher than that of neat AESO. When using BC as the binder for sisal fibres, a stiffer material can be produced (AESO-sisal-BC). This result corroborates with the mechanical properties of AESO-sisal and AESO-sisal-BC shown in Table 5. The storage moduli of the materials stayed relatively constant until a sharp decrease can be seen around 40° C.-50° C., where this corresponds to the softening of the matrix. The storage moduli and the improvements in storage moduli of the (nano)composites are tabulated in Table 6. An improvement over neat AESO of 95% and 246% were observed for AESO-sisal and AESO-sisal-BC.

TABLE 6

Mechanical $T_g$, storage moduli (G') and improvements in storage moduli of the sisal fibre reinforced (nano)composites.

| Sample | Mechanical $T_g$ (° C.) | G' @ −100° C. (GPa) | Improvements in G' over neat AESO (%) |
|---|---|---|---|
| Neat AESO | 50 | 0.53 | — |
| AESO - Sisal | 53 | 1.03 | 95 |
| AESO - Sisal - BC | 53 | 1.82 | 246 |

Figure 6:
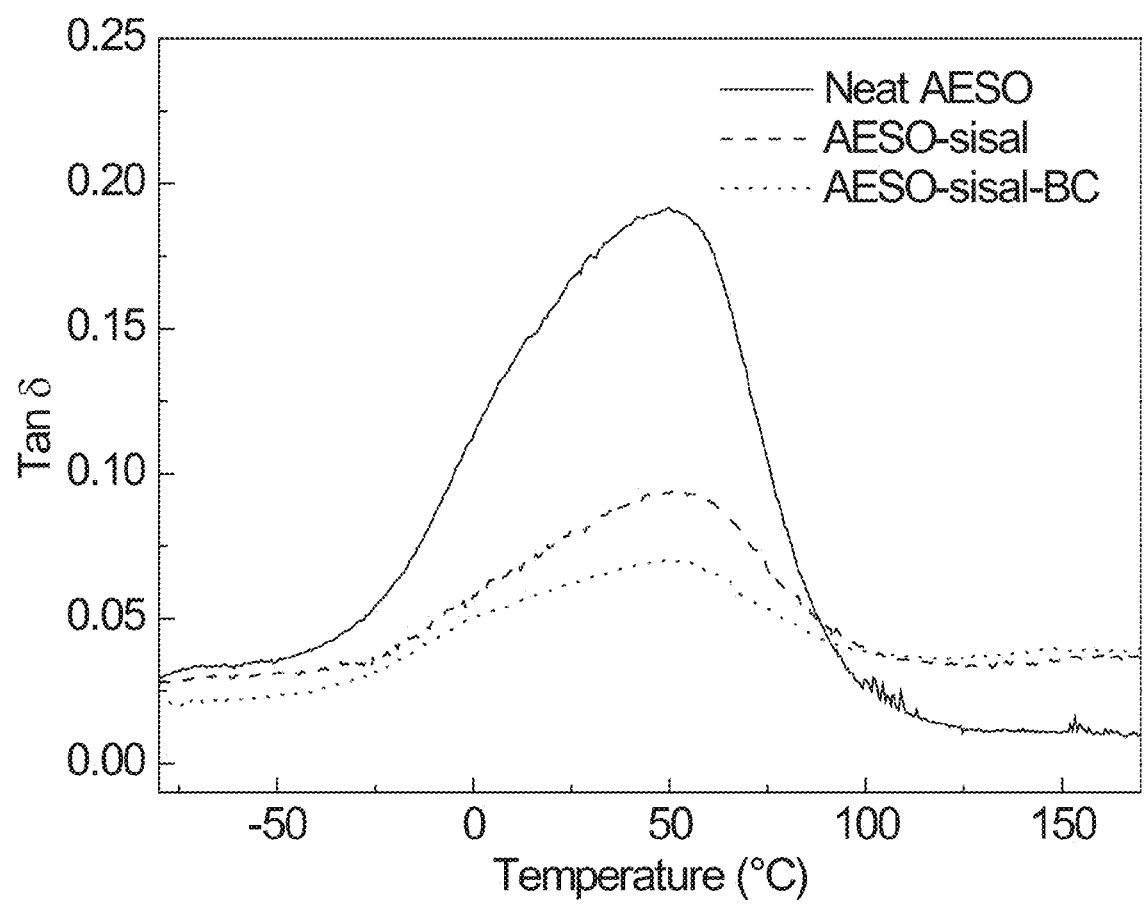
FIG. 6 illustrates the energy dissipation factor (tan δ) of neat AESO, AESO-sisal and AESO-sisal-BC.

The tan δ of neat AESO and its (nano)composites is shown in FIG. 6 and the mechanical $T_g$ (the peak of tan δ) is tabulated in Table 6. Tan δ, which measures the damping properties of a material is also determined by the quality of the fibre-matrix interface. Large tan δ amplitude indicates weak interface whereas a small tan δ amplitude indicates strong fibre-matrix interface. It can be seen from FIG. 6 that AESO-sisal-BC showed lower tan δ amplitude compared to AESO-sisal. Therefore, the significant improvement seen in AESO-sisal-BC over both neat AESO and AESO-sisal can be attributed to the enhanced fibre-fibre/fibre-matrix stress transfer. The rigid skeletal of BC and the formation of BC network within the matrix also contributes to this significant improvement in the properties of AESO-sisal-BC.

What is claimed:

1. An article of manufacture,
    wherein the article comprises a composite material,
    wherein the composite material comprises a reinforcement and a matrix, and
    wherein the reinforcement comprises a plant fiber and is coated with nanofibrillated cellulose.
2. The article of claim 1, wherein the article is a packaging article.
3. The article of claim 1, wherein the article is a household article.
4. The article of claim 1, wherein the article is a sports article.
5. The article of claim 1, wherein the article is an automotive article.
6. The article of claim 1, wherein the article is a construction article.
7. The article of claim 1, wherein the composite material is fully biodegradable.
8. The article of claim 1, wherein the reinforcement is impregnated with the matrix.
9. The article of claim 1, wherein the reinforcement is extruded with the matrix.
10. The article of claim 1, wherein the matrix is a thermoplastic polymer.
11. The article of claim 1, wherein the matrix is poly (lactic acid) (PLA), polyhydroxyalkanoate (PHA), cellulose acetate butyrate (CAB), cellulose butyrate, polypropylene (PP), polystyrene (PS), polymethylmetharylate (PMMA), lyocell, or rayon.
12. The article of claim 1, wherein the matrix is a resin.
13. The article of claim 1, wherein the matrix is a plant based epoxy resin.
14. The article of claim 1, wherein the matrix is acrylated epoxidised soybean oil (AESO) or epoxidised linseed oil.
15. The article of claim 1, wherein at least a portion of the nanofibrillated cellulose is orientated perpendicular to a surface of the reinforcement.
16. The article of claim 1, wherein the nanofibrillated cellulose binds together the reinforcement.
17. The article of claim 1, wherein the nanofibrillated cellulose is bacterial cellulose.
18. The article of claim 1, wherein the nanofibrillated cellulose has an average width of from 0.5 to 100 nm.
19. The article of claim 1, wherein the nanofibrillated cellulose has an average width of from 1 to 50 nm.
20. The article of claim 1, wherein the nanofibrillated cellulose has an average width of from 5 to 20 nm.
21. The article of claim 1, wherein the nanofibrillated cellulose has an average length of from 0.5 to 1000 μm.
22. The article of claim 1, wherein the nanofibrillated cellulose has an average length of from 1 to 500 μm.
23. The article of claim 1, wherein the nanofibrillated cellulose has an average length of from 10 to 150 μm.
24. The article of claim 1, wherein the plant fiber is from flax, sisal, abaca, bamboo, banana, coir, coconut husk, cotton, henequen, hemp, hop, jute, palm, ramie, or any combination thereof.

* * * * *